Nov. 1, 1955　　　　　　　E. R. AMMON　　　　　　2,722,348
HOSIERY INSPECTING AND HANDLING APPARATUS
Filed Feb. 6, 1951　　　　　　　　　　　　　14 Sheets-Sheet 1
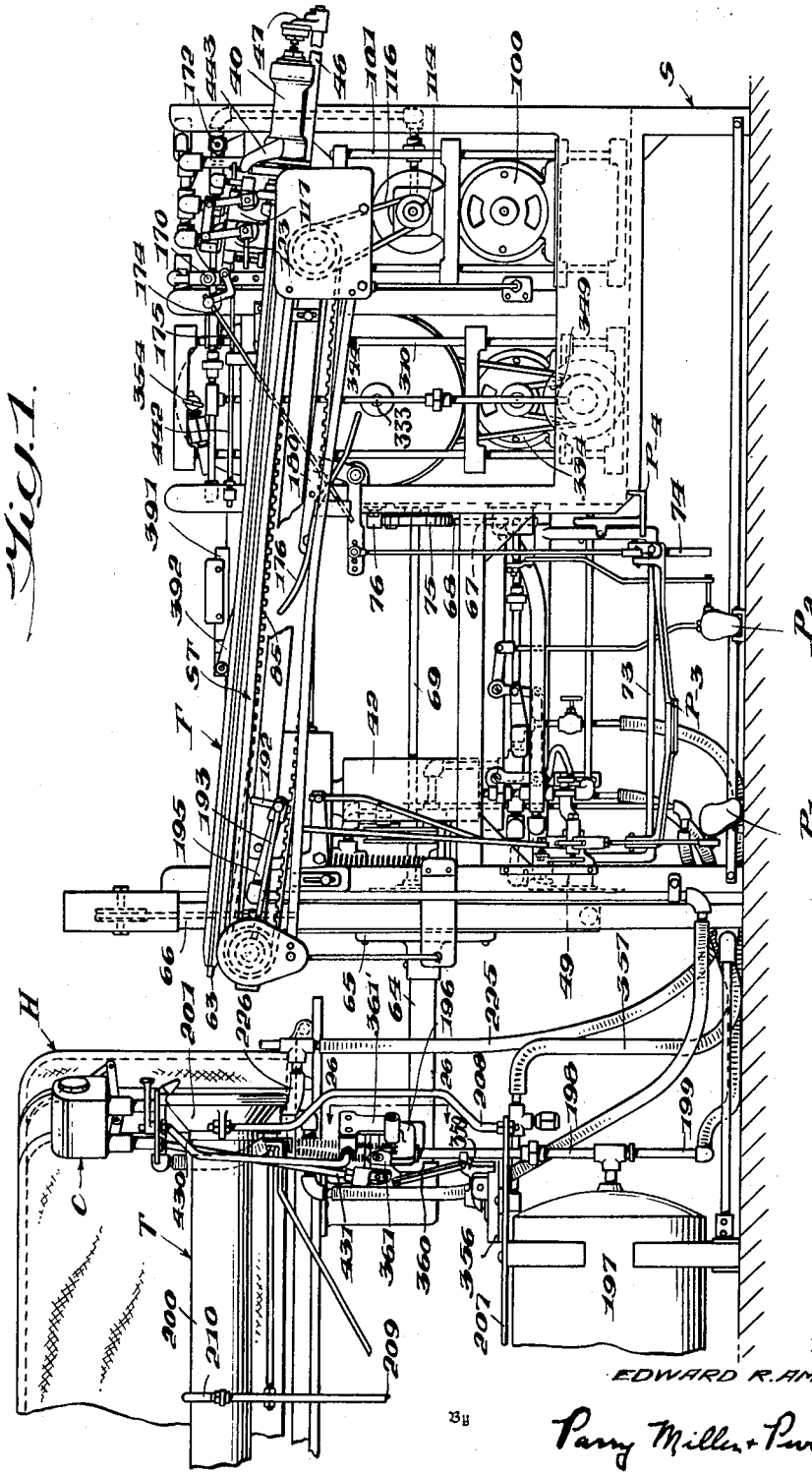
Inventor
EDWARD R. AMMON,
By Parry, Miller & Puverill
Attorneys

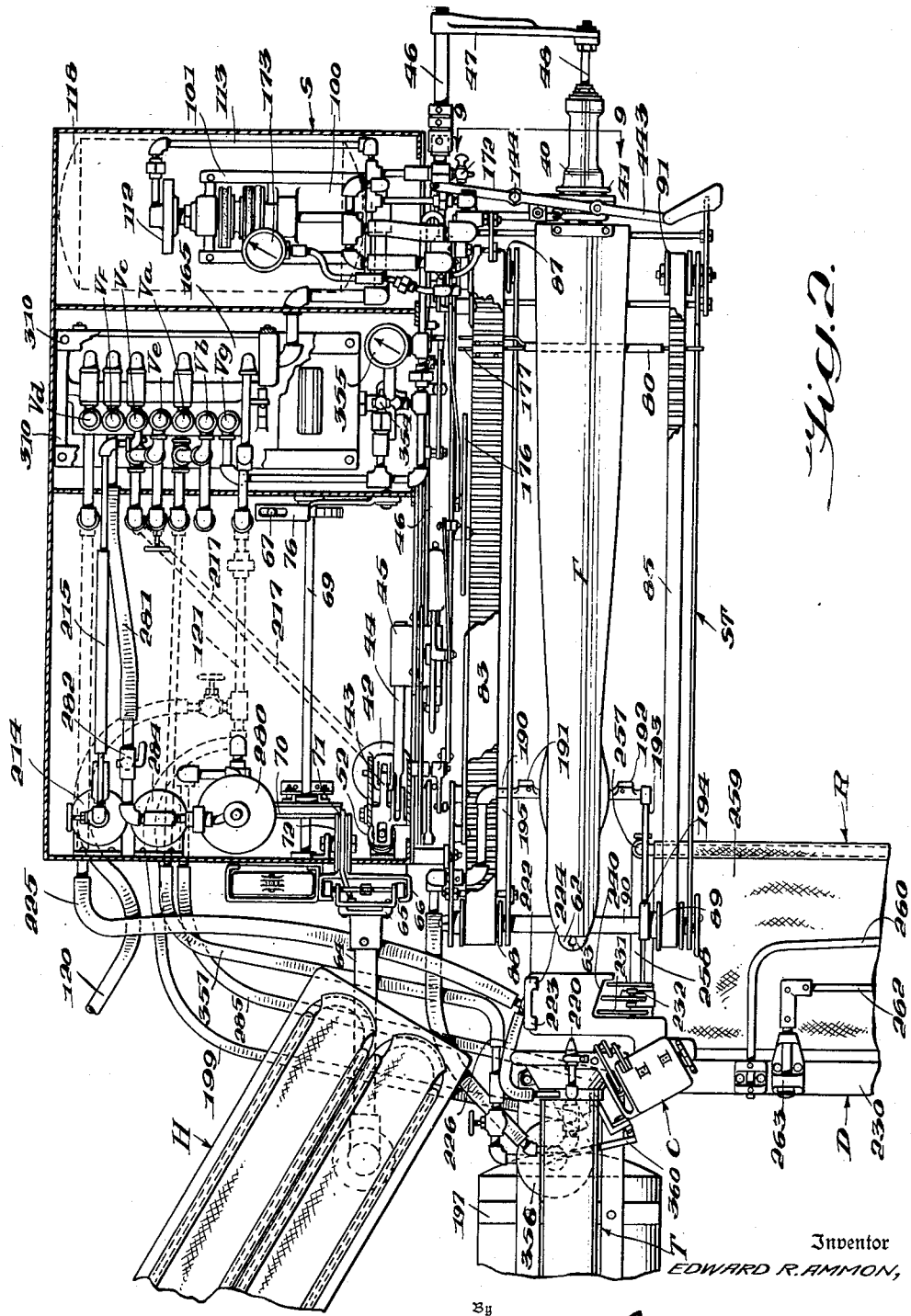

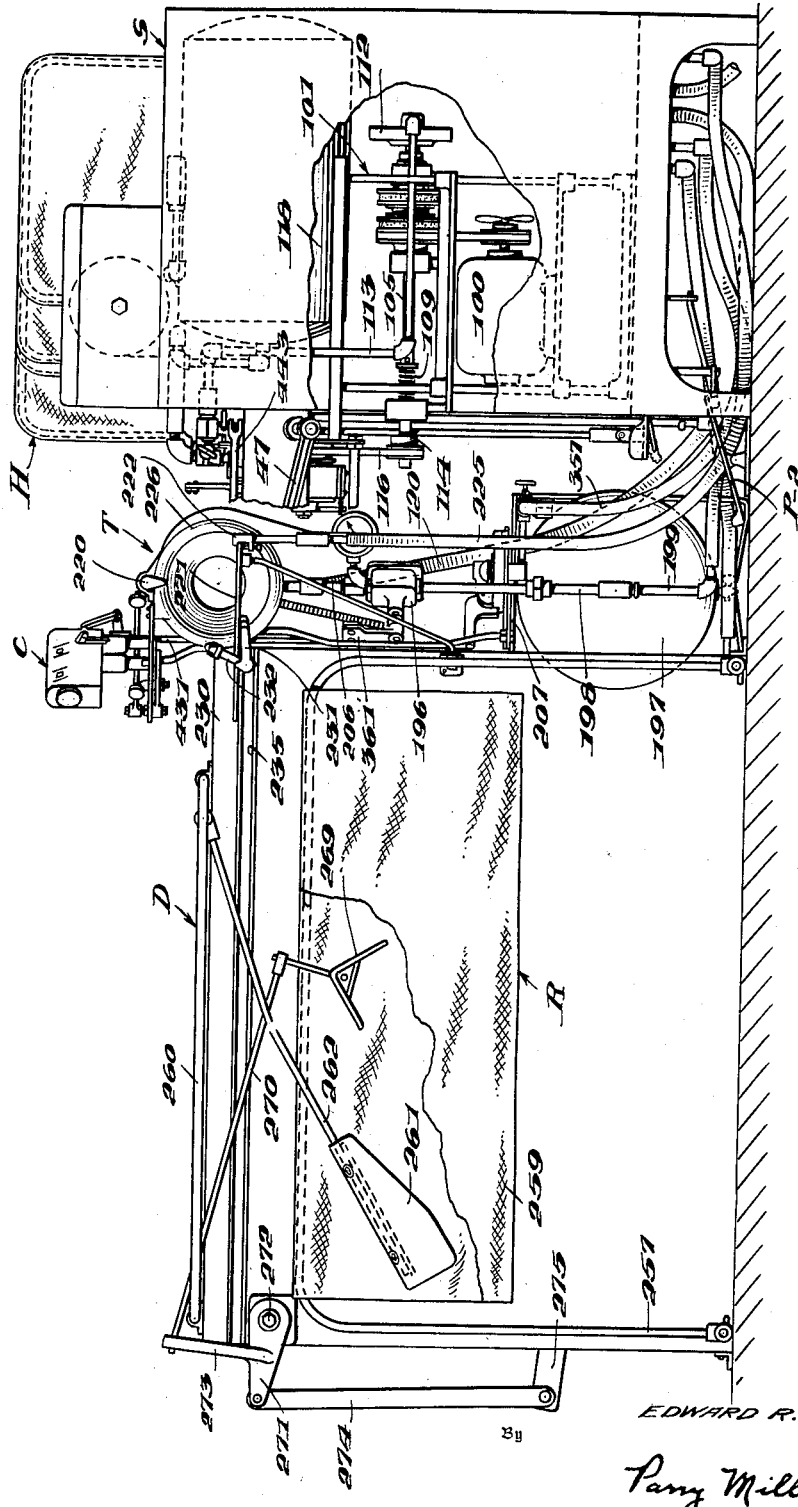

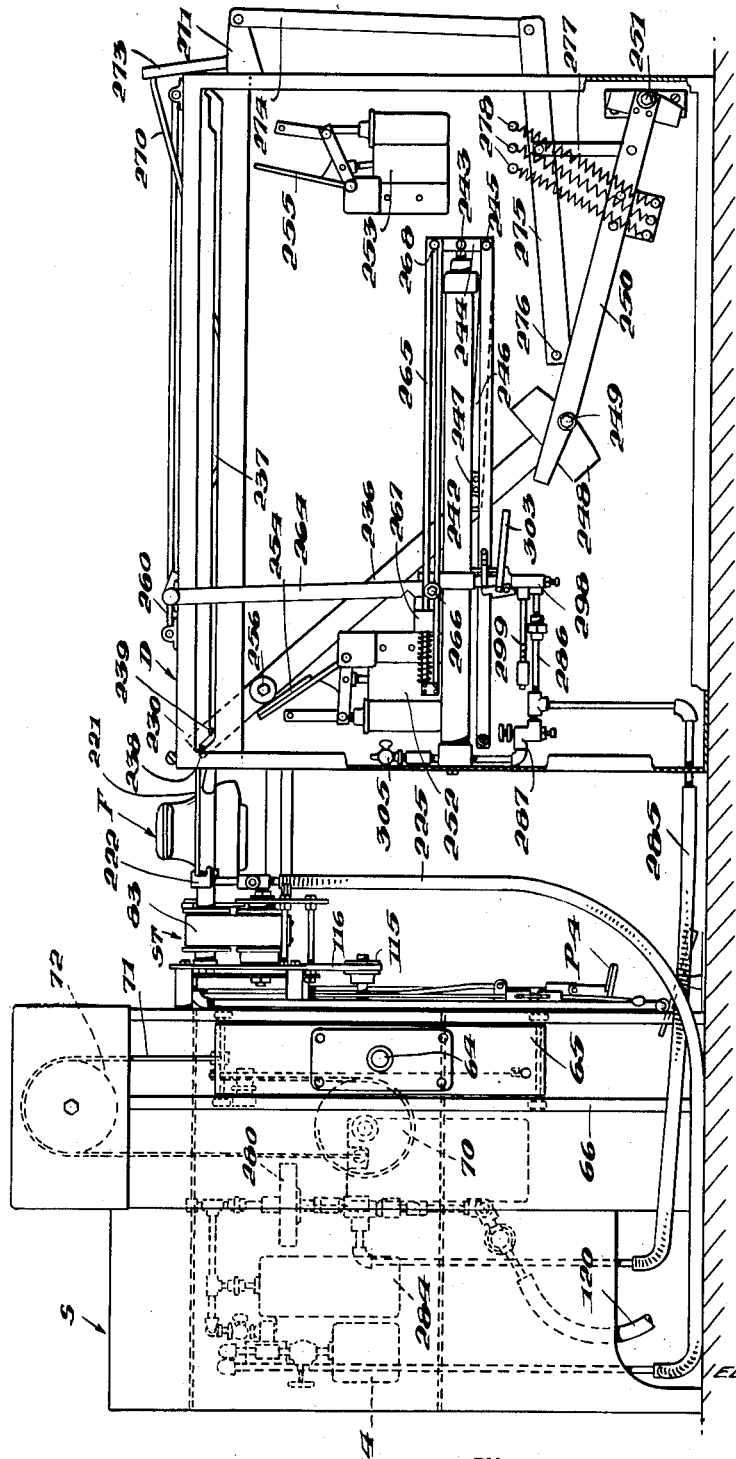

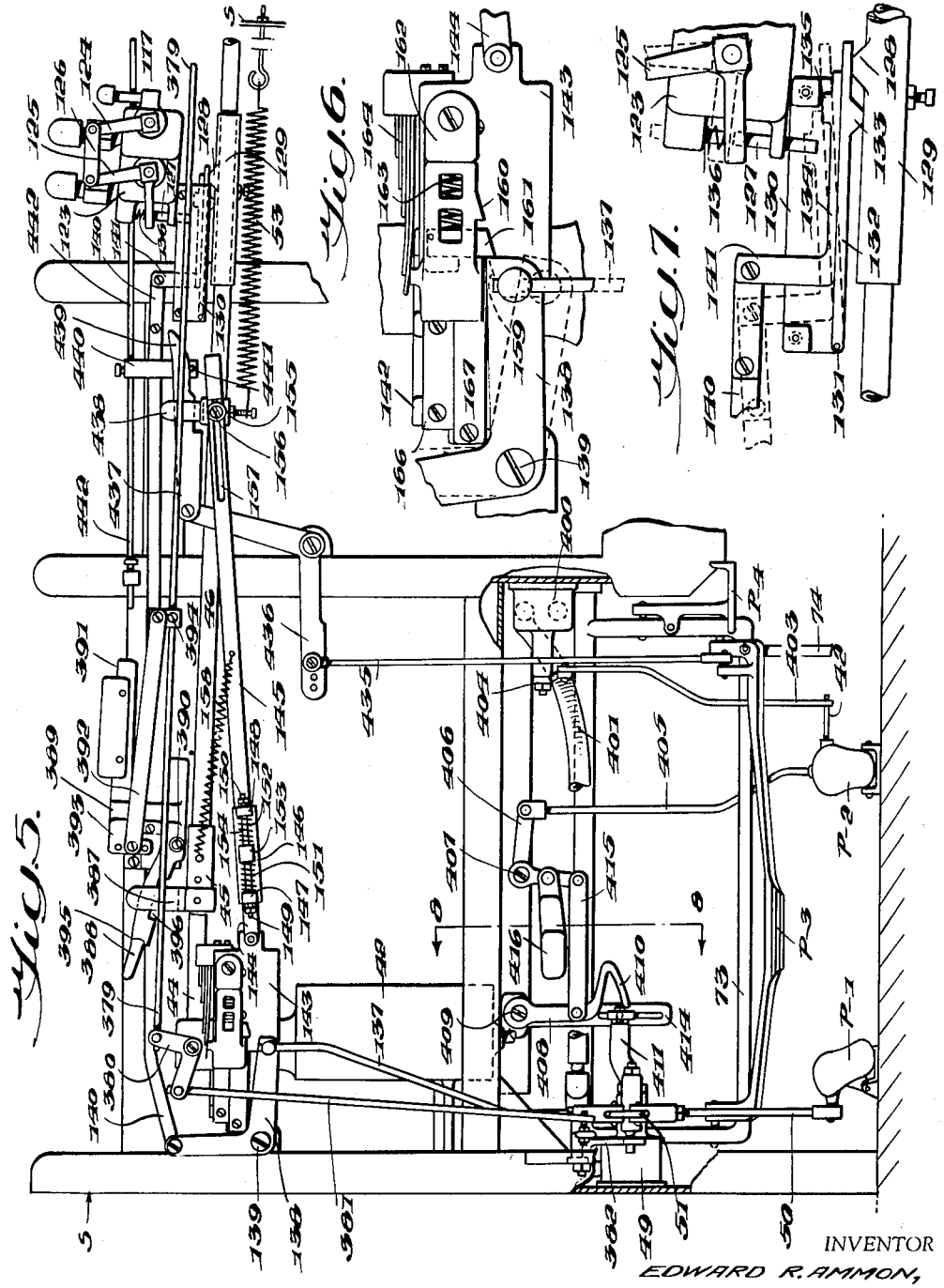

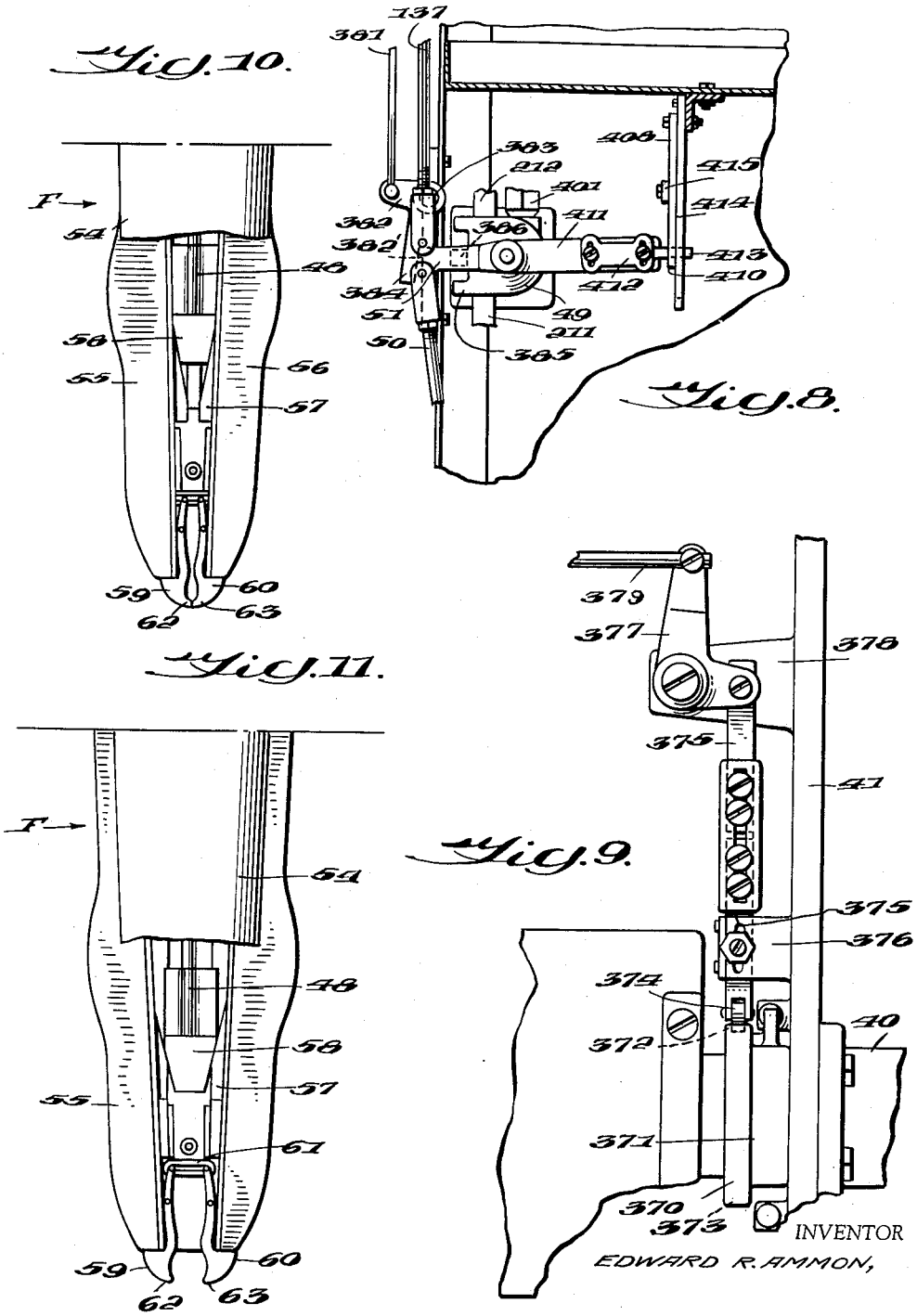

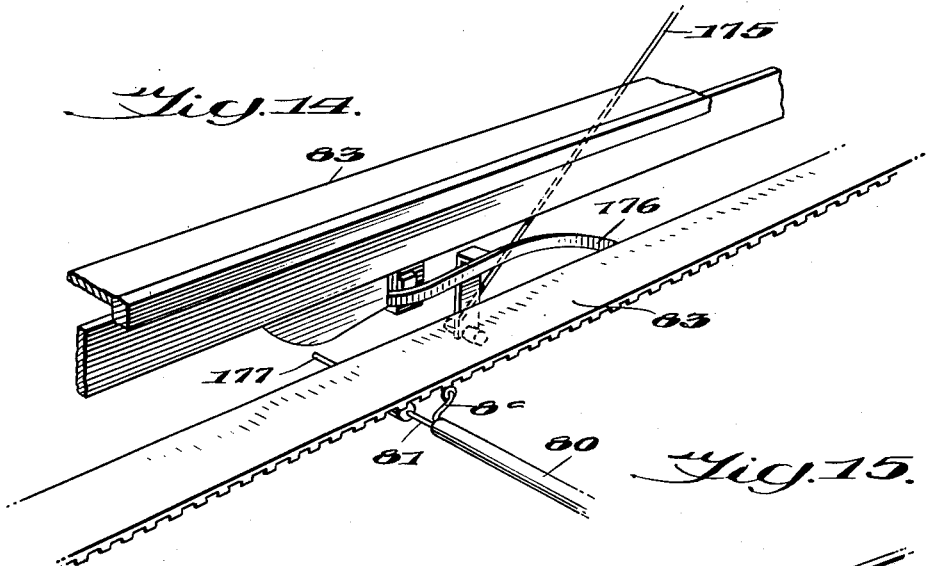
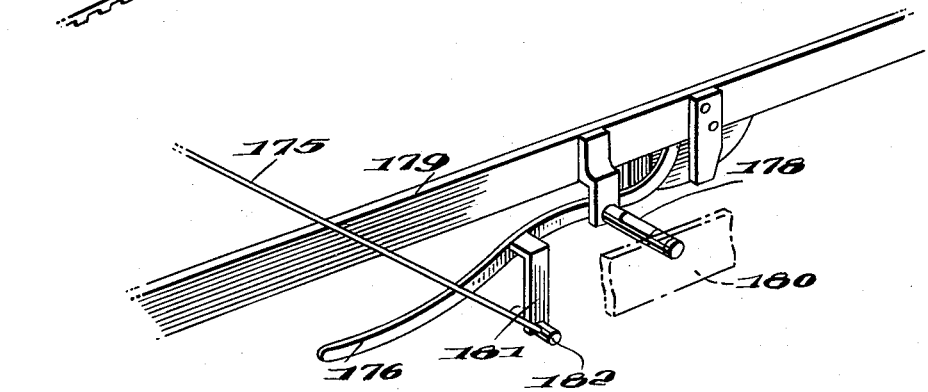
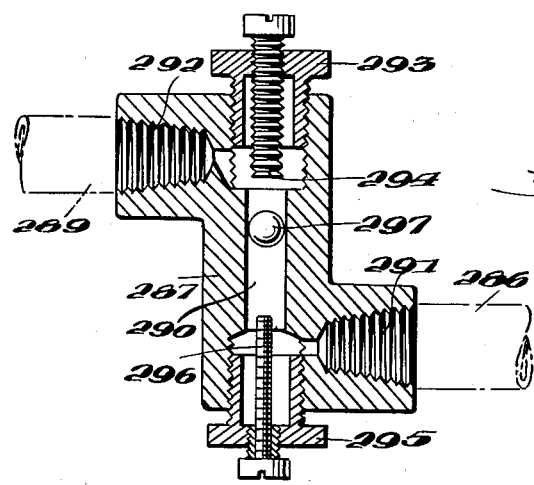

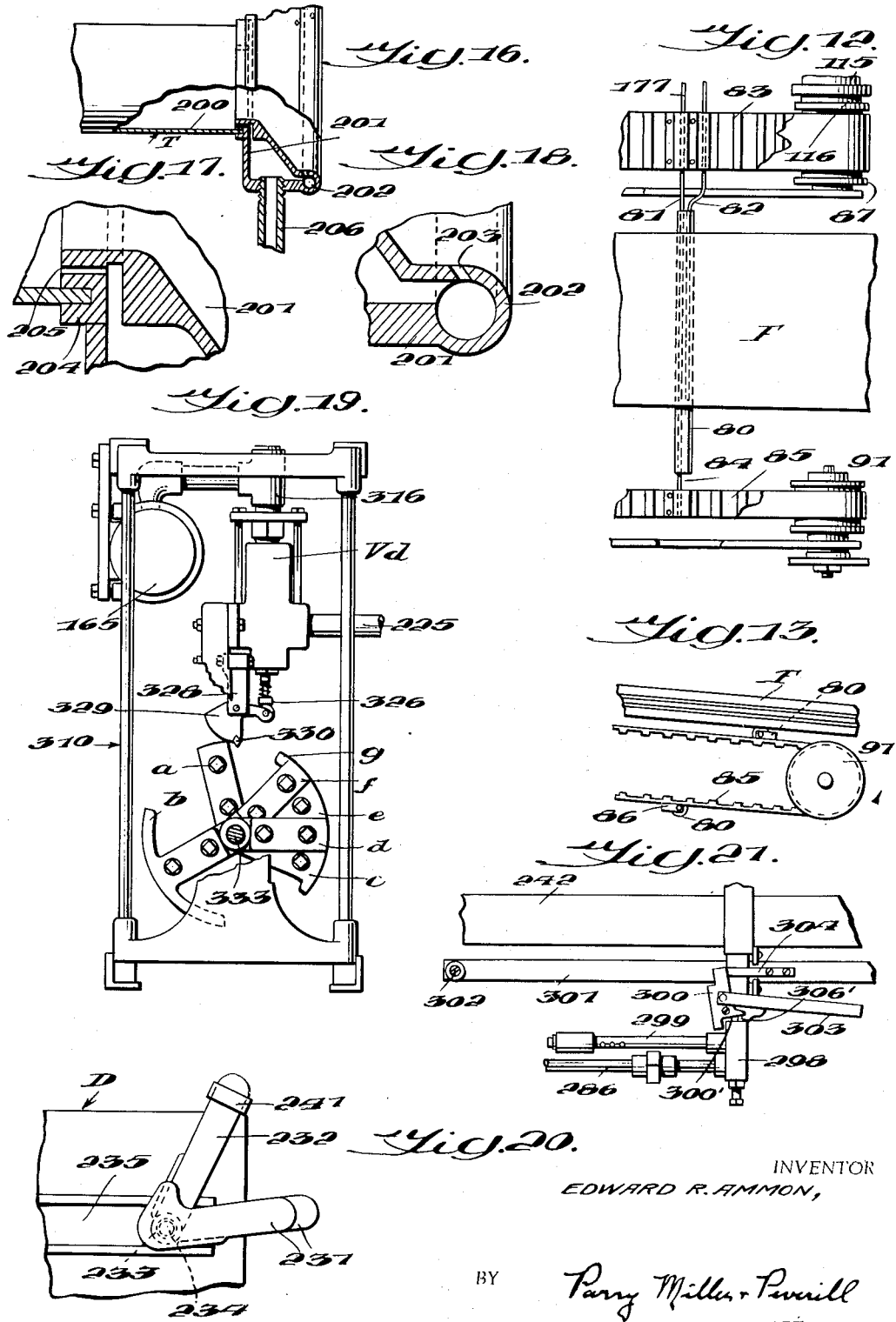

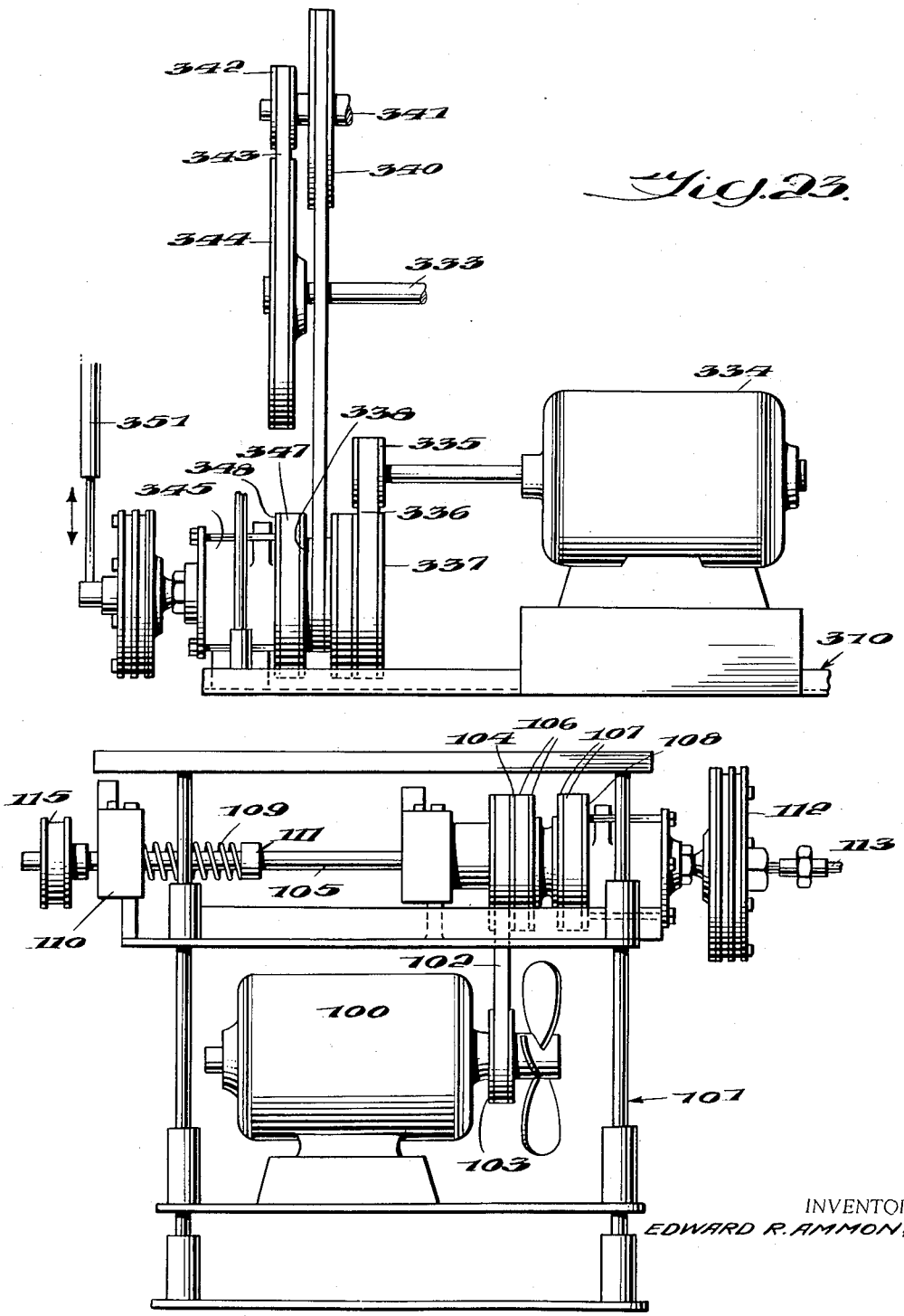

Nov. 1, 1955 — E. R. AMMON — 2,722,348
HOSIERY INSPECTING AND HANDLING APPARATUS
Filed Feb. 6, 1951 — 14 Sheets-Sheet 10
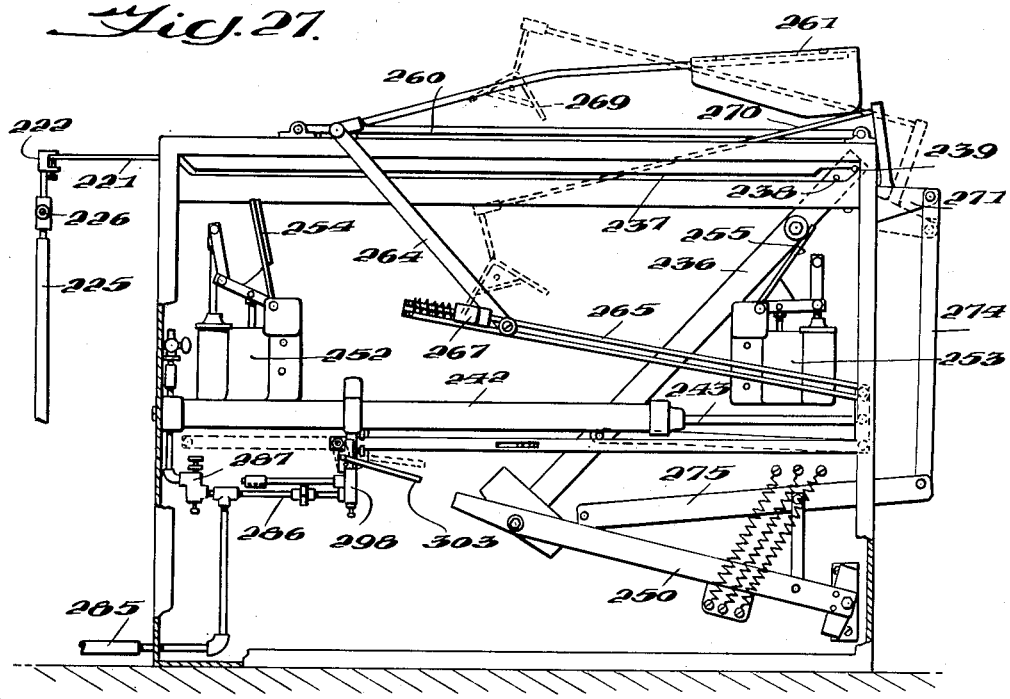
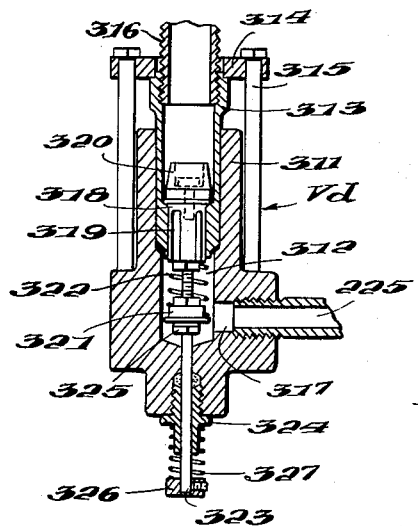
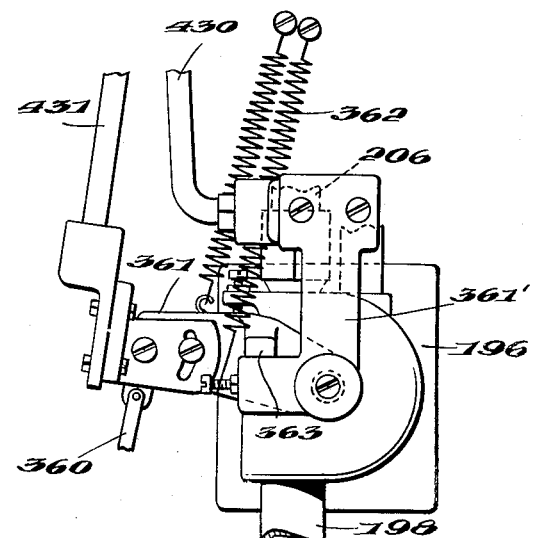
INVENTOR
EDWARD R. AMMON,
BY Parry Miller & Purnell
ATTORNEYS Nov. 1, 1955  E. R. AMMON  2,722,348
HOSIERY INSPECTING AND HANDLING APPARATUS
Filed Feb. 6, 1951  14 Sheets-Sheet 11
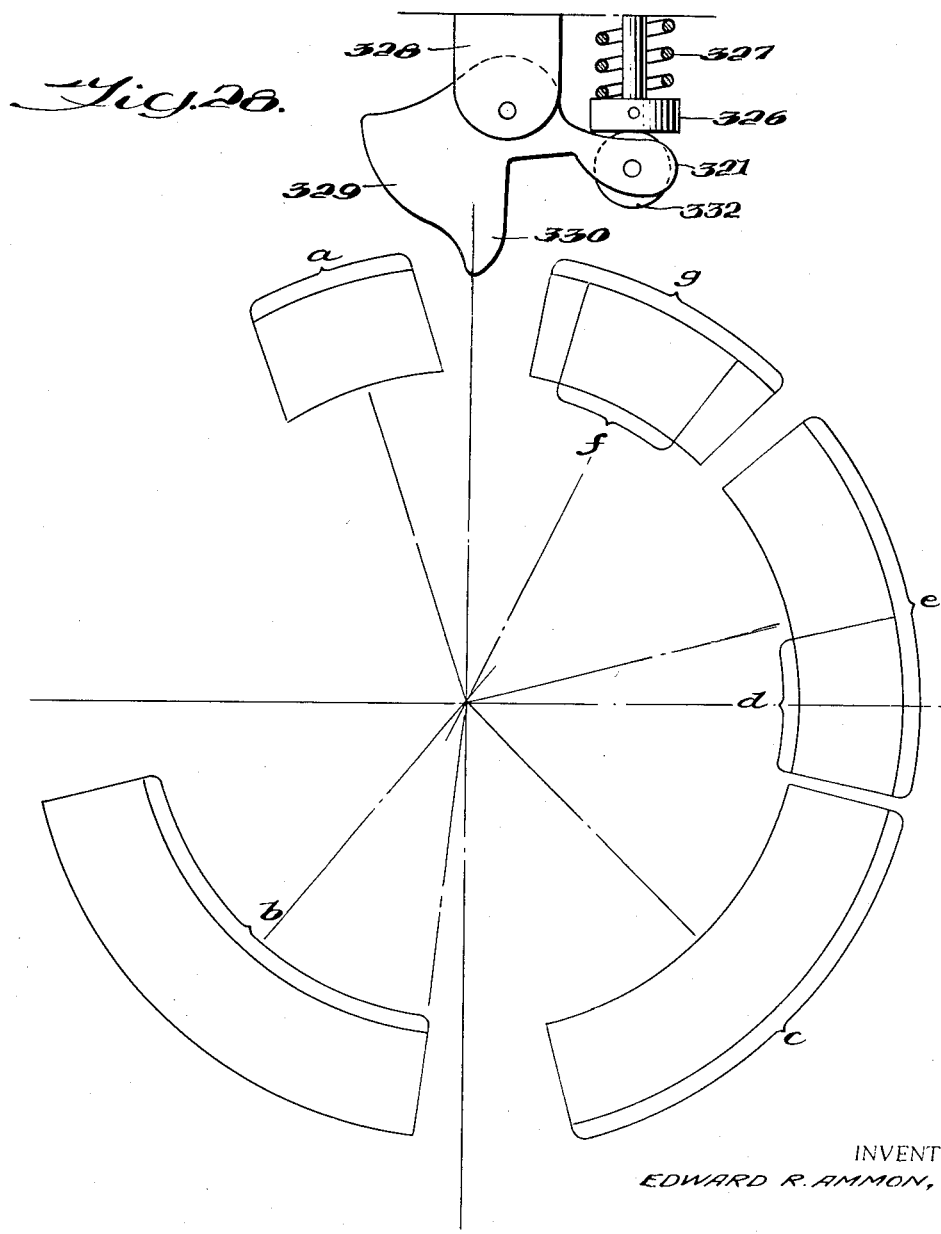
INVENTOR
EDWARD R. AMMON,
BY Parry Miller + Peverill
ATTORNEYS

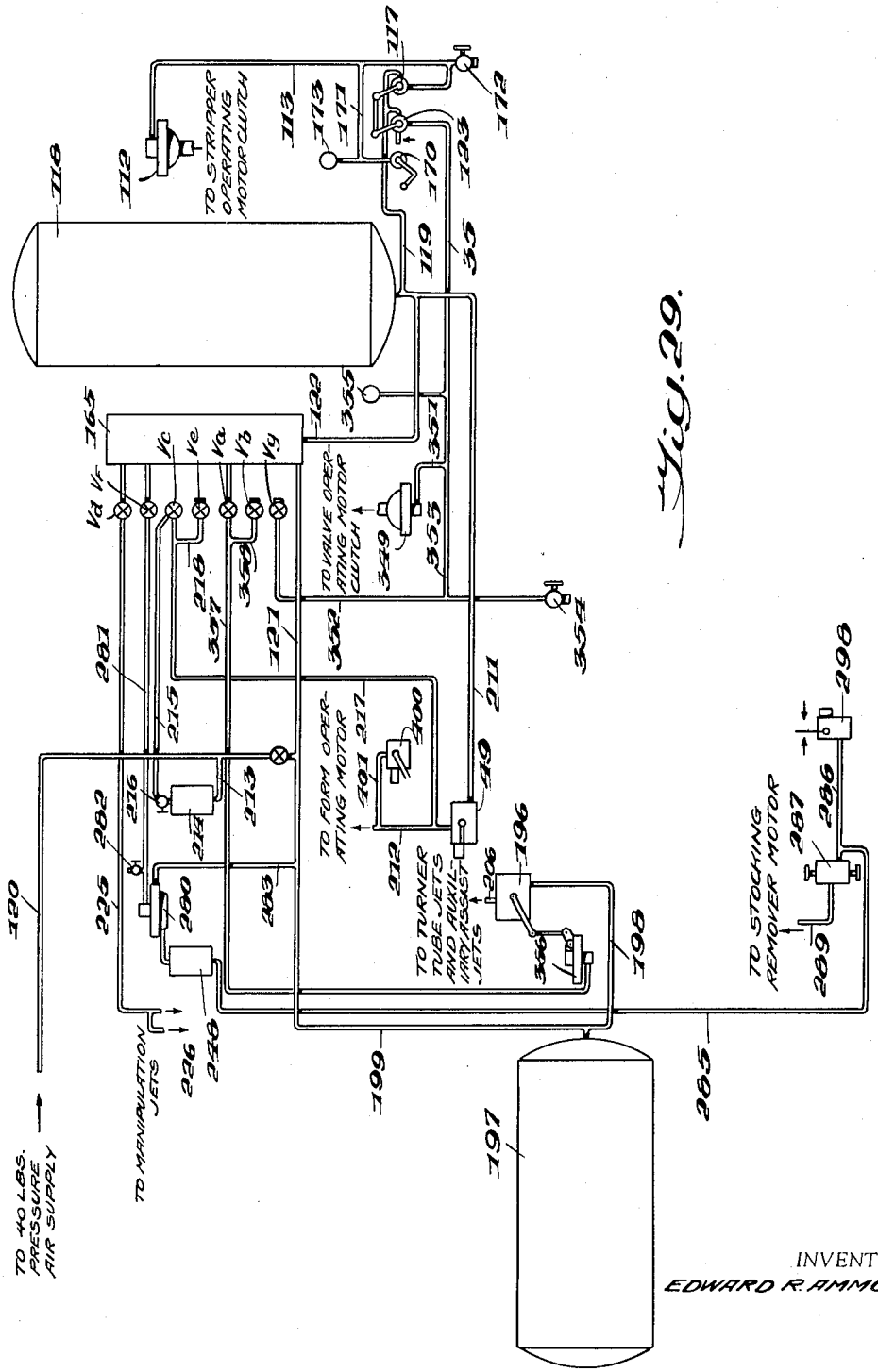

Nov. 1, 1955 E. R. AMMON 2,722,348
HOSIERY INSPECTING AND HANDLING APPARATUS
Filed Feb. 6, 1951 14 Sheets-Sheet 13
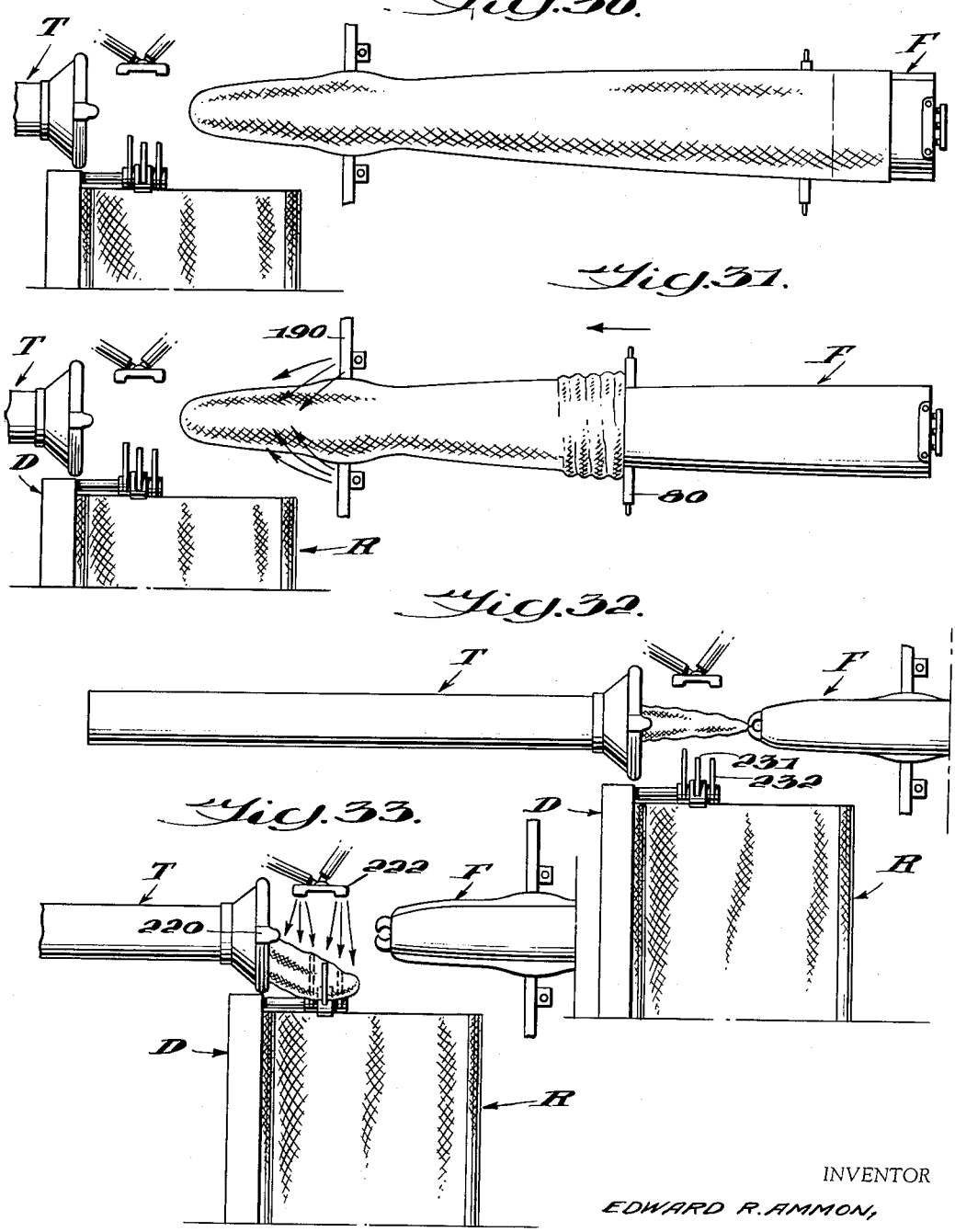
INVENTOR
EDWARD R. AMMON,
BY Parry Miller Purvill
ATTORNEYS

United States Patent Office 2,722,348
Patented Nov. 1, 1955

2,722,348
HOSIERY INSPECTING AND HANDLING APPARATUS

Edward R. Ammon, Reading, Pa., assignor, by mesne assignments, to Southern Textile Machinery Company, Incorporated, Paducah, Ky.

Application February 6, 1951, Serial No. 209,574

62 Claims. (Cl. 223—43)

This invention relates to the inspection of hosiery in the course of manufacture and is particularly directed to new and useful apparatus for automatically handling hosiery in conjunction with a hosiery inspecting machine.

Inspection of hosiery for possible defects conventionally is carried out in hosiery mills prior to dyeing and, in the case of hosiery of nylon or similar resilient thermoplastic synthetic yarns, before pressurized steam preboarding or equivalent treatment to set the knitted loops. The inspecting machine comprises a form having expansible parts adapted to stretch hosiery thereon so that any defects may be seen more readily by the inspector. Perfect hosiery after inspection is collected in a receiver and defective hosiery is deposited elsewhere.

The general object of the invention is to provide automatic mechanism for handling hosiery after inspection so that the inspecting operation is speeded up and the inspector relieved of manual duties and mental effort which are both time-consuming and tiring. A larger daily volume of hosiery can be handled by each inspecting machine and the inspecting efficiency of the inspector is materially increased.

One particular object of the invention is to provide for the mechanical stripping of hosiery from an inspecting form following inspection and, further, to initiate the stripping operation automatically.

Another object of the invention is to provide suitable mechanism for automatically turning hosiery inspected in inside-out condition to right-side-out condition at a point outwardly of the toe end of the inspecting form.

Another object of the invention is to provide a hosiery toe gripping mechanism in conjunction with an inspecting form which holds the toe of hosiery until the turning operation has been completed and, further, to provide for the automatic release of the gripping mechanism when turning has been completed.

Another object of the invention is to provide mechanism for automatically transferring hosiery from an inspecting form to turning mechanism spaced therefrom. Both the turning mechanism and transfer mechanism must be arranged in spaced relation to the inspecting form so as not to interfere with the hands of the inspector in drawing hosiery on the form at the beginning of inspection.

Another object of the invention is to provide for the automatic delivery of inspected hosiery to a receiver and also to provide for the automatic stacking of articles one on top of another in lengthwise extended condition. Such mechanism is particularly useful in conjunction with nylon or other hosiery which must be handled manually in the course of a pre-boarding or other operating stage preliminary to dyeing. Another alternative object of the invention is to provide for automatic delivery of inspected hosiery to dye nets where the hosiery is of such character that it is ready to go to the dyeing department directly from the inspecting department.

Another object of the invention is to provide automatic mechanism for manipulating the toe of hosiery after turning in a turning mechanism to a position where it may be conveniently picked up by mechanism which is to deliver the hosiery to a stocking receiver.

Another object of the invention is to provide automatic control mechanism governing the operation of hosiery handling mechanism in conjunction with a hosiery inspecting machine, the control mechanism being so designed that each handling operation is automatically initiated and also carried out rapidly one after another, in proper timed sequence.

Another object of the invention is to provide fully automatic mechanism for handling hosiery after inspection designed to eliminate any manual handling of hosiery from the time the hosiery is on the form after inspection until it reaches a collecting receiver.

Another object of the invention is to provide mechanism for preventing operation of automatic hosiery handling devices so that defective stockings may be withdrawn from an inspecting form manually.

Another object of the invention is to provide safety controls in conjunction with automatic hosiery handling apparatus adapted to prevent operation of various parts of the mechanism under various conditions.

Another object of the invention is to manipulate inspected hosiery by means of air jets.

Still another object of the invention is to provide a pneumatic pressure system including air operated motors and control devices in handling inspected hosiery and to provide an automatic arrangement for effecting operation of such system.

The above and other objects, features and advantages of the invention will be understood by reference to the illustrative apparatus shown in the accompanying drawings. In such drawings:

Fig. 1 is a front elevation of a hosiery inspecting machine and automatic hosiery handling apparatus employed in conjunction therewith in a preferred embodiment of my invention;

Fig. 2 is a top plan view corresponding to Fig. 1;

Fig. 3 is an end elevation looking towards the right of Fig. 1, certain parts broken away to show interior parts, and further showing hosiery delivering and receiving apparatus not seen in Fig. 1;

Fig. 4 is an end elevation of the hosiery inspecting machine and other apparatus looking towards the left end of Fig. 1 and further showing the back side of the hosiery delivering apparatus found in Fig. 3;

Fig. 5 is an enlarged front elevation of certain of the operating mechanisms and with certain of the front parts shown in Fig. 1 omitted to show other parts;

Figs. 6 and 7 are enlarged fragmentary views of certain of the operating parts found at the left and right, respectively, of Fig. 5;

Fig. 8 is an enlarged transverse elevation taken at approximately line 8—8 of Fig. 5;

Fig. 9 is an enlarged fragmentary top plan view taken approximately at line 9—9 of Fig. 2 but with certain parts omitted for clarity;

Figs. 10 and 11 are fragmentary top views, partly in elevation and partly in section of the toe and adjoining foot portion of the hosiery supporting form of the inspecting machine and showing the hosiery toe gripping fingers and foot stretching parts in retracted and expanded positions, respectively;

Fig. 12 is a fragmentary top view of a portion of the hosiery stripping mechanism with certain areas broken away to show detail, and Fig. 13 is a corresponding fragmentary front elevation;

Fig. 14 is a fragmentary perspective view looking from the front at a portion of the control parts of the hosiery stripping mechanism, and Fig. 15 is a perspective view from the rear of certain of the parts shown in Fig. 14;

Fig. 16 is a fragmentary front view, partly in elevation and partly in section of a portion of a hosiery turning mechanism seen at the left of Figs. 1 and 2, and Figs. 17 and 18 are enlarged fragmentary sections of air jets appearing in Fig. 16;

Fig. 19 is a rear end elevation of automatic control valve mechanism shown in top view in Fig. 2;

Fig. 20 is an enlarged fragmentary elevation of the hosiery toe clasp fingers of the delivery mechanism shown in Fig. 3;

Fig. 21 is an enlarged fragmentary elevation of the automatic exhaust valve mechanism of the hosiery delivery mechanism shown in Fig. 27;

Fig. 22 is an enlarged vertical section of the air inlet control valve for the stocking delivery mechanism shown in the lower left-hand portion of Fig. 27;

Fig. 23 is a fragmentary side elevation of the power and drive assembly for the automatic cam operated control valves shown in Figs. 1, 2 and 19;

Fig. 24 is a corresponding side elevation of the power and drive assembly for the stripper mechanism;

Fig. 25 is a vertical section of one of the control valves shown in Figs. 2, 3 and 19;

Fig. 26 is an enlarged side view taken approximately at line 26—26 of Fig. 1 showing the control valve for the hosiery delivery mechanism;

Fig. 27 is a rear elevation of the hosiery delivery mechanism shown in Fig. 4, with parts of the casing removed to show interior details;

Fig. 28 is an enlarged somewhat diagrammatic view of the rotary operating cams seen in Fig. 19 for the automatic control valve mechanism and showing the operating sequence of the cams;

Fig. 29 is a schematic view of the air circuit and control valves through which the various hosiery handling mechanisms are caused to operate in timed sequence;

Figs. 30 through 34 are somewhat diagrammatic views showing hosiery at progressive stages of handling by the automatic handling mechanism of the invention;

*The inspecting machine*

Figure 34:
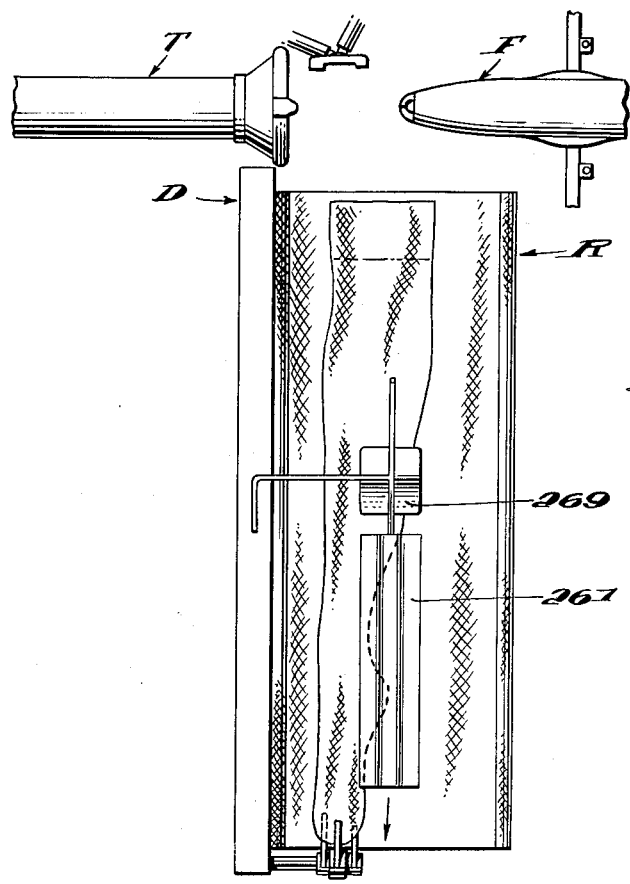

The main hosiery inspecting machine as shown in Figs. 1 through 4 includes a supporting stand or table S, on the front side of which is located a flat expansible hosiery inspecting form F. As best shown in Figs. 2 and 9 such form is supported for rotation by a suitable bushign 40 mounted on a bracket 41 which projects forwardly from stand S at the upper right-hand end thereof. As in the case of other expansion forms the hosiery expanding parts of form F are expanded through an air motor 42, shown in Figs. 1, 2 and 5. The piston rod of such motor 42 connects with a bell crank 43 (Fig. 2) which in turn connects with a short horizontal power transmitting rod 44 located inside the frame of stand S. Through rod coupling member 45 rod 44 is rigidly connected with a long horizontal power transmitting rod 46, the right end of which projects beyond the right end of the stand. Rigid with such rod and as shown in Figs. 2 and 3 is a power transmitting cross arm 47. Extending through form F is a longitudinally movable expanding rod 48 which projects outwardly through bushing 40 and is rigidly connected with cross arm 47.

Air pressure of approximately forty pounds is supplied to motor 42 through the inlet valve of a combined dual inlet and exhaust valve 49, best shown in Figs. 5 and 8. The inlet valve is opened by depression of the toe of the inspector on the toe of the foot pedal P–1. The pedal connects with rotating operating rod of the valve through connecting rod 50 and crank arm 51. The interior of valve 49 has not been shown since it is of a type commonly used for air-operated expansible inspecting forms. The same comprises separate inlet and exhaust valve elements arranged for independent movement by a pivoted interior actuating arm rotatable with external actuating arm 51. Such arms have a neutral position in which both valves are closed. Depressing the arms effects opening of the inlet valve element to supply air to the form motor. Raising the arms part-way to neutral position results in closing of the inlet valve. Raising the arms above neutral position opens the exhaust valve element and partial return toward neutral position causes closing of the same. The connections between foot pedal P–1 and external arm 51 are such that in the rest position of the pedal, valve arm 51 is horizontal at neutral position.

Depressing the toe of the pedal pulls arm 51 downwardly to open the inlet valve. Collapsing of the expanding parts of form F after inspection of a hosiery article thereon has been completed is effected by depressing the heel of pedal P–1 to close the air inlet element of valve 49 and open the exhaust valve element thereof to vent motor 42 to the atmosphere, arm 51 moving upwardly above its horizontal position. Actual contraction of the form parts is effected through master vertical springs 52 (Fig. 2) which act against bell crank 43 at the top of the air motor and also through auxilliary springs 53 which connect an intermediate portion of power transmitting rod 46 to a suitable point at the right end of stand S, as shown in Fig. 5. It will be understood that power transmitting rods 45 and 46, cross arm 47 and form rod 48, move to the left to expand the form parts under actuation of the air motor and move to the right to collapse the form parts through contraction of springs 52 and 53.

Form F is composed of two smooth-surfaced spaced side members 54. As shown in Figs. 10 and 11, hosiery expanding members 55 and 56 are movable laterally outwardly beyond the opposite margins of the side members. Such expanding parts are provided at recurrent longitudinal points with similar opposing wedges 57 which coact with actuating wedges 58 fixed on expanding rod 48. Movement of the rod towards the toe end of the form effects lateral expansion of the expanding parts by wedging action of 57 and 58. Reverse movement of the rod towards the base end of the form relieves the wedging action and expanding parts 55 and 56 are collapsed laterally into the form by a series of interconnected leaf springs (not shown). It will be understood that the expanding members 55 and 56 extend from the base end of the form to the toe areas so that hosiery can be stretched laterally for inspection from heel to toe.

The toe end of the hosiery is expanded by opposing elements 59 and 60 having leg portions pivotally mounted at intermediate points of their length to the opposite expanding members 55 and 56. Slidably connected to the rear ends of the legs is a transverse link 61 which causes the elements to tilt on their pivots to spread the hosiery, engaging outer portions thereof laterally in opposite directions in the expanded position of the expanding members 55 and 56 shown in Fig. 11. The function of the rounded outer surfaces of the elements 59 and 60 is to expand the toe extremity of the hosiery. When the expanding parts are collapsed, inturned opposed gripping fingers 62 and 63 on such elements grip the extremity of the hosiery toe fabric between them for purposes hereafter to be explained.

The hosiery inspecting machine may further be provided with a dual hosiery supporting tray H, shown at the left of Figs. 1 and 2. Hosiery is placed in the tray with the open top end facing the toe of form F so that the operator may conveniently grasp the hosiery top with the fingers of her two hands and draw the same into inspecting position on the form.

Tray H is supported by a mounting arm 64 carried by a vertically moving carriage 65 riding in a channeled housing 66 secured to the left end of the stand S. The purpose of such mounting is to enable tray H to be progressively raised as the level of hosiery decreases due to repeated withdrawals so that the top of the pile can be kept generally level with the toe end of form F. The gradual raising of tray H may be effected by the foot of the inspector through pedal P-3, connecting rod 67, pawl 68, ratchet wheel 75, rotary shaft 69, reel 70 and chain or cable 71 which pass upwardly over a pulley 72 at the top of housing 66 and thence downwardly to connect with carriage 65. Pedal P-3 is hinged to a horizontal depressible frame 73 having arms pivoted on the underframe of stand S and the forward portion of the frame supports pedal P-3 so that the two are depressed simultaneously. A stop foot 74 projecting downwardly from the right side of the pedal limits downward movement. When tray H has been elevated step by step to its uppermost position and the hosiery supplied therein has been exhausted, it is lowered by a single movement of further pedal P-4 which is pivotally mounted on the right side of frame 73 independently of pedal P-3. Depression of pedal P-4 to the floor carries frame 73 with it below the lower limit of movement of pedal P-3, stop foot 74 causing pedal P-3 to hinge upwardly on the frame. The lower end of connecting rod 67 is connected with the frame and such extreme movement causes the rod to move upwardly to engage a cam released plate 76. This shifts the rod slightly rearwardly to release pawl 67 from ratchet wheel 75 so that tray H moves down of its own weight to its bottom position. A second conventional pivoted pawl which locks ratchet wheel 75 against rotation after each elevation by pedal P-3 is also released by the cam plate.

The hosiery inspecting machine as so far described was known in the prior art. The elevatable hosiery tray H is generally similar to that shown in my prior patent No. 2,454,622 granted November 23, 1948 but as shown in Fig. 2 of the present application is located rearwardly and at an angle to the toe end of the form as shown in Fig. 2 herein, instead of being substantially aligned with the axis of the form as in said patent. Such change is to accommodate certain automatic hosiery handling mechanisms hereafter to be described.

*The stripper mechanism*

A stripper mechanism, generally designated ST, is provided and adapted to mechanically strip hosiery lengthwise off the toe end of form F as soon as the expanding form parts have been collapsed following inspection. Such mechanism is power-driven at high speed and its operation is started automatically through suitable control mechanism responsive to retraction of one of the form expanding parts. Through further controls the stripping mechanism is automatically stopped at the completion of its cycle. The same is shown in Figs. 1, 2, 4, 12 and 13.

Referring particularly to Figs. 2, 12 and 13, a hosiery stripper element 80 in the form of a soft, smooth, rubber tube extends transversely of the underside of form F and is adapted to be moved lengthwise with a wiping action in contact with the underside of the form from base to toe to push the top and rest of the hosiery off the toe end of the form. A pair of resilient supporting wires 81 and 82 secured to an inner driving belt 83 extends substantially through element 80. A further similar supporting wire 84 secured to an outer driving belt 85 extends through element 80 in the opposite direction. The oppositely connected wires, which are anchored in a bushing such as 86 riveted to the belts, are free from connection with each other so as to yieldably hold element 80 in engagement with the underside of the form.

Inner driving belt 83 is supported at its right end by a driving pulley 87 located adjacent the base end of the form, and at its left end by pulley 88 located adjacent the toe end of the form. Outer driving belt 85 is supported at its left end by pulley 89 having driving connection through rotatable shaft 90 with pulley 88. A pulley 91 supports the right end of the outer belt. As will be clear from Fig. 2, belts 83 and 85 are laterally spaced a sufficient distance from the form to provide adequate clearance for the hands of the inspector in drawing hosiery on the form and in turning the form over. It will further be apparent from Fig. 13 that the stripper element has a rest position on the lower path of the driving belts so as to be clear of the form except during an actual stripping operation. The belts are driven in a counter-clockwise direction to bring stripper element 80 into engagement with the form on the upper path of the belts. The stripper element moves along the form from right to left to the toe end, at which time its hosiery stripping action is completed and returns from left to right along the underpath of the belts to the rest position shown in Fig. 13.

A supporting framework for the described movable stripping parts is mounted on the front of stand S as best shown in Figs. 1 and 2. It may take any suitable form. It is not believed necessary to describe the same in detail. Suffice it to say that it includes inner mounting members firmly secured to stand S and journaling the inner driving belt pulleys, outer plates on the forward side of the outer driving belt mounted by bolts on the inner plates and journaling the outer driving belt pulleys and a series of belt guide and connecting bars extending along the driving belts and interconnecting the right and left plates.

*Stripper driving and control mechanism*

The stripper mechanism is driven by a power unit located in the right end of stand S as shown in Figs. 1, 2 and 3. Such unit as further shown in Fig. 24 includes a fan-cooled electric driving motor 100 supported in a suitable chassis 101. Through belt 102 and pulleys 103 and 104 the motor drives shaft 105 which is journaled for slight axial movement by the chassis. Pulley 104 is free on shaft 105. A conventional friction-faced rotary clutch disc 106 fixed to the shaft makes driving connection with one face of pulley 104 on slight axial movement of the shaft towards the front of chassis 101 to provide driving connection between the motor and shaft 105. Return axial movement of the shaft to its normal rear position causes a rotary friction brake disc 107 secured to the shaft to engage a stationary disc 108 and quickly stop rotation of the shaft. The shaft is normally held in its right position by spring 109 which rests at its left end against stationary journal 110 on the chassis. The right end of the spring acts against collar 111 secured to the shaft.

A conventional diaphragm type servo-actuator 112 operated by air pressure from air line 113 engages the driving clutch by moving shaft 105 axially forward. Upon release of air pressure from the diaphragm of the servo-actuator spring 109 returns the shaft to its rear position.

At its outer end, on the forward side of stand S, shaft 105 mounts a driving pulley 114 as shown in Figs. 1 and 3. A corresponding pulley 115 (Fig. 12) rigid with inner right driving belt pulley 87 is in driving connection with pulley 114 through a driving belt 116. Thus stripper element 80 and driving belts 83 and 85 are selectively driven under control of clutch 106 and servo-actuator 112. Immediately upon disengagement of the clutch brake disc 107 insures stopping of the stripping mechanism with stripper element 80 in its rest position shown in Figs. 1 and 2. Driving motor 100 runs continuously and is controlled by a manual switch (not shown).

An automatic control for activating the servo-actuator 112 to start operation of the stripper mechanism will be understood by reference to Figs. 1, 2, 5, 7 and 29. The air supply line 113 is controlled by a conventional air inlet valve 117 mounted on the front upper right-hand portion of stand S. As best shown in Figs. 2 and 29 such inlet valve is supplied with air pressure from a reservoir tank 118 located in the upper right-hand portion of the stand above motor chassis 101.

Air line 119 connects the tank with the valve. The tank is supplied with air through main supply line 120 from a suitable source through branch hose or pipe lines 121 and 122, as will be clear from Fig. 29.

Mounted to the left of air inlet control valve 117 is similar air inlet valve 123 which controls parts yet to be described. As shown in Fig. 5 a tiltable actuating arm 124 mounted on an operating shaft of valve 117 and a similarly mounted bell crank actuating arm 125 of valve 123 are interconnected at their upper ends by a link 126 for simultaneous reciprocating movement. A small vertical spring interposed between the horizontal arm of bell crank 125 and a portion of the housing of valve 123 yieldably urges the parts in a counterclockwise direction to the closed position of both valves. Slidably mounted in a further protruding portion of the casing of valve 123 is a vertically movable valve actuating pin 127. Upward movement of such pin acts against the horizontal arm of bell crank 123 to turn the parts in a clockwise direction to the open position of the two valves.

Referring to Figs. 5 and 7, actuating pin 127 is indirectly actuated by a cam 128 secured by a sleeve 129 to power-transmitting rod 46 by which expansion of form F is effected by air motor 42 as previously explained. Overlying sleeve 129 and supported by the front of stand S is a stationary rectangular hollow casing 130. Pivoted at its left end by pin 131 in the lower portion of the casing is a plate 132 having a cam 133 protruding through an opening in the bottom of the casing for coaction with cam 128. Seating on the upper side of plate 132 is an upper plate 134 having a boss projecting upwardly from its right end. Plate 134 is mounted for lengthwise sliding movement on plate 132. In the right-hand position shown in full line in Fig. 7 boss 135 is offset from valve actuating pin 127. It is in this position when power transmitting rod moves to the left to expand the form for hosiery inspection. During each movement cam 128 momentarily swings both plates 132 and 134 upwardly by coaction with cam 133 but pin 127 is not actuated and the two valves remain closed.

Incident to the collapsing of the form after an inspecting operation plate 132 is moved lengthwise to the dotted line position shown in Fig. 7 to bring boss 135 beneath pin 127. When power transmitting rod 46 moves to the right and approaches the end of its stroke cams 128 and 133 are again momentarily engaged to raise plates 132 and 134, causing both plates to swing upwardly about pivot 131 so that boss 135 causes pin 127 to briefly open valves 117 and 123 through the operating parts previously described. As soon as cams 128 and 133 are out of engagement, as in Fig. 7, the plates and pin move downwardly under action of spring 136. The momentary opening of valve 117 supplies full forty-pound operating pressure to servo-actuator 112. This initiates operation of the stripping mechanism as previously described. As rod 46 reaches the extreme right end of its stroke plate, 134 is again moved to its right-hand position so that valves 117 and 123 will not again be actuated on the next movement of the rod to the left.

The longitudinal movement of plate 132 is coordinated with movement of foot pedal P–1. As best shown in Figs. 5 and 8 the pedal is connected as previously explained through rod 50 with the combined inlet and exhaust valve 49 of the form expanding motor 42 through valve operating arm 51. Also connecting with such arm is an upwardly extending rod 137 which connects at its upper end with the lower arm of a bell crank 138 pivoted at 139 on the front of stand S. The upper arm of the bell crank is connected with a long horizontal rod 140. The right end of such rod is rigidly connected with an upwardly extending arm integral with plate 134. When the toe of pedal P–1 is depressed to effect form expanding operation of air motor 42, rod 137 causes bell crank 138 to move clockwise, resulting in movement of rod 140 and plate 134 to the right position shown in Fig. 7. When the heel of pedal P–1 is depressed by the inspector for collapse of the form, the same connecting linkage causes plate 134 to move to its dotted line left position so that rod 46, during its collapsing movement to the right, will effect opening of valve 117 to start the stripping mechanism.

Provision is made for automatically moving plate 134 away from its position before the inspector releases the heel of pedal P–1. This is because of the fact that immediately following stripping of hosiery from the form the form is again expanded and collapsed to release the toe of the stocking from gripping fingers 62 and 63 and it is undesirable that power transmitting rod 46 should again actuate valves 117 and 123 during such operation, which is effected automatically and independently of pedal P–1. The automatic return means for plate 134 is shown in Figs. 5 and 6, and it is rendered operative by rod 46 as it approaches the right end of its collapsing stroke after it has effected actuation of valves 117 and 128 to initiate the stripping operation. Mounted on a stationary supporting member 142 near the upper front portion of stand S for lengthwise movement with rod 46 is a cam supporting plate 143. A pair of grooved track elements 166, the lower of which is hidden from view, engage a slide element 167. Plate 143 is secured to such slide for lengthwise movement therewith. Secured to the right end of plate 143 is a short rod 144 which connects with a long rod 145 through a shock-absorbing connection adapted to prevent shock on various parts. Such connection includes member 146 having end bosses 147 and 148 in which are threaded screws 149 and 150 adjustable to tension a pair of springs 151 and 152 located between the bosses. Member 146 is mounted on rod 144 and the opposing ends of the springs act against a projecting element 153 secured to the left end of rod 145 and capable of movement under shock in opposition to the springs in slot 154 in member 146.

The right end of rod 145 is connected to rod 46. A collar 155 is secured to rod 46 in which is threaded screw 156 which engages a slot 157 in rod 145. A spring 158 connects rod 145 so that rod 145 is tensioned towards the left as seen in Fig. 5. Such tension serves to hold the right end of slot 157 against screw 156. Plate 143 moves with rod 46 to the left and to the right on the expanding and collapsing strokes of the rod during hosiery inspection. By reason of the lost motion connection provided by slot 157 and screw 156 plate 143 and rods 144 and 145 can remain stationary when rod 46 is again reciprocated during re-expansion of the form for release of the hosiery toe by the gripping fingers.

Projecting rearwardly from the lower arm of bell crank 138 is a cam finger 159 which is coactive with a cam surface provided on plate 143. Secured to the front of such plate is a longitudinally extending member 162 the right underside of which, including cam portion 160 which inclines downwardly towards the left, constitutes a part of the cam surface. A further part of the cam surface is provided by a combined movable cam and latch element 161 which extends vertically through the hollow interior of member 162. Element 161 is mounted for slight lateral yielding movement by coil spring 163 in member 162 and for slight vertically yielding movement by leaf spring 164 mounted on top of plate 143. The function of the cam surface on plate 143 is to act on cam finger 159 on bell crank 138 and cause a sufficient clockwise movement of the bell crank to move plate 134 away from its left position through the linkage previously described. Element 161 yields slightly upwardly during the camming action to reduce shock on the bell crank and connecting parts. When element 161 passes the cam finger the latter is engaged by the left underside of member 162 so that it cannot rotate counterclockwise and element 161 is latched against the cam finger so that movement of plate 143 to the left is prevented during re-expansion of the form.

To explain more fully, plate 143 is initially in its right-hand position in relation to bell crank 138 as shown in Fig. 5. When the toe of pedal P–1 is depressed to expand the form for stocking inspection the lower arm of the bell crank is below the combined cam and latch element 161 and plate 143 is moved to the left with rod 46, bringing the right end of plate 143 over the right end of the bell crank arm. Plate 134 is in its right position shown in Fig. 7. Depression of the heel of pedal P–1 to exhaust the form motor through valve 49 causes rod 51 to turn bell crank 138 counterclockwise to bring its cam finger 159 into engagement with the right underside of member 162. In such movement the bell crank, through rod 140, draws plate 134 into the left dotted line position shown in Fig. 7. On its collapsing stroke rod 42 through cams 128 and 133, boss 135 and actuating pin 127 briefly opens valve 117 to start the stripping operation. Plate 143 is drawn to the right with rod 46 through its connecting rods 144 and 145. Just before rod 46 reaches the end of its collapsing stroke cam finger 159 and bell crank 138 are moved downwardly by the downwardly inclined portions of the cam surface on member 162 and element 161 as they move to the right with plate 143. Such movement of the bell crank is sufficient to cause rod 140 to move plate 134 out of its left position and move boss 135 clear of actuating pin 127 of valves 117 and 123. Such movement of the bell crank is also sufficient to cause rod 137 and arm 51 to close the exhaust of the form motor main control valve 49 and to cause rod 50 to partially raise the heel of pedal P–1 against the pressure of the heel of the inspector.

At the end of the collapsing stroke of rod 46, plate 143 is again in its right position with cam finger 159 engaged by the latch portion of element 161 and by the left undersurface of member 162. Since bell crank 138 is held against counterclockwise turning movement, plate 143 cannot be moved back to its left position accidentally under the pressure of the inspector's heel on pedal P–1. Plate 143 is latched in its right position and remains there when rod 46 moves to the left during re-expansion of the form for release of the stocking toe. The stroke of rod 46 is approximately three inches and lost motion slot 157 in rod 145 is of the same length so that screw 156 merely rides to the left end of the slot. After rod 46 has again returned to its collapsed position following release of the hosiery toe from the form, relief of pressure by the inspector on the heel of pedal P–1 will permit bell crank 138 to move down to the dotted line position shown in Fig. 6 where it is clear of the latch on element 161 so that plate 143 can again move to the left with rod 46 during the next hosiery inspecting operation.

Stopping of the stripping mechanism at the end of its cycle previously described is separately and automatically controlled from the stripping mechanism itself. An air exhaust valve 170 is mounted on the front of stand S to the left of valves 117 and 123 as shown in Fig. 1 but omitted for clarity in Fig. 5. Such valve connects through a branch pipe 171 with pipe 113 leading to servo-actuator 112 which controls the clutch of the stripper operating electric motor 100. Air is vented from the diaphragm of the clutch actuator by opening of exhaust valve 170. Also connecting with line 113 as shown in Figs. 1, 2 and 29 is an adjustable vent valve 172 which remains permanently open. The full forty-pound air pressure required for operation of some other portions of the apparatus is not necessary for servo-actuator 112, and a substantial portion of such pressure is relieved by the vent valve immediately after operation of inlet valve 117. The remaining pressure is sufficient to cause the servo-actuator to maintain the motor clutch engaged and it is then quickly relieved by brief opening of exhaust valve 170. The pressure acting on the actuator may be determined by pressure gauge 173, shown in Figs. 2 and 29, and vent valve 172 may be adjusted to produce the desired gauge pressure.

A crank arm 174 is moved clockwise to open exhaust valve 170 through an actuating rod 175, seen in Fig. 1. As further shown in Figs. 14 and 15 such rod is operated by a curved trip arm 176 by engagement therewith of a finger 177 formed as an extension of wire 81 of the stripper element. The trip arm is pivotally mounted slightly above the midpoint of its length by a pivot bolt 178 supported by two parallel bars 179 and 180 constituting parts of the frame of the stripper mechanism. The trip arm is located just rearwardly of the inner belt 83 of the stripping mechanism (Fig. 2) and extends below the level of the lower path of the belt. As the stripping element approaches its rest position finger 177 rides against the lower curved portion of the trip arm 176 and briefly elevates it to cause rod 175 to open valve 170. Such rod is connected to an integral depending short arm 181 on the trip arm through a rod coupling 182. By reason of the position of its pivot the trip arm drops as soon as the stripping element has passed the lower end thereof and valve 170 is closed. By reason of the brake associated with the drive from the operating motor 100 to belts 83 and 85 of the stripping mechanism, stripping element 80 comes to rest at a short distance beyond the trip arm in the position shown in Figs. 2 and 13.

First air jet device

Stripper element 80 serves to strip hosiery on the form to the toe end thereof. To project the stocking outwardly beyond the toe end of the form, an air jet device is provided. This includes a jet tube 190, shown in Figs. 1 and 2, extending transversely below form F at about the heel area. Such tube carries a pair of air jets 191 and 192 located on opposite margins of the form and adapted to direct air upwardly along an inclined path towards and beyond the toe of the form. The jet tube is supported by arm 193 which connects at one end with a collar 194 journaled on pulley drive shaft 90. The other end of tube 190 is supported by a section of piping 195 through which air is supplied to the tube. Such piping is supported on the end of stand S by clamps (not shown). An inlet valve 196 shown in Figs. 1, 2, 26 and 29 controls the supply of air to the jet tube through piping 195 from a compressed air reservoir tank 197 which connects with the valve through pipe 198. Air is supplied to the tank from the main air supply 120 through pipe 199 so that the air discharged from the jets is under forty pounds of pressure.

Valve 196 is automatically opened and closed through automatic timing mechanism to be disclosed later. It is here sufficient to state that the valve operates to start an air blast from jets 191 and 192 substantially as the stripping element is beginning to strip hosiery off the form because the complete stripping motion requires less than ½ second. Just after the stripping element has carried the leg and top portion of hosiery past the heel area on the form the air blast from the jets propels the hosiery horizontally outward beyond the toe end of the form. The hosiery is delivered to the hosiery turning mechanism by the force of the air blast.

Hosiery turning mechanism

A hosiery turning unit T is shown in Figs. 1, 2, 3, 16, 17 and 18. The same includes a hollow straight tube 200 slightly longer than hosiery length and of a diameter approximately the same as the width of the form or just sufficient to allow hosiery to move therethrough without clogging. At the inlet end of the tube is a hollow receiving bell 201. At the outer large end of the bell is an integral peripheral tube 202 communicating with the main interior of bell 201, all as best shown in Figs. 16 to 18. A series of circumferentially spaced air jets 203 are provided in tube 202. Such jets are inclined inwardly and rearwardly to propel hosiery into the bell. An annular hollow base 204 connects the bell 201 with the inlet end of tube 200. A further series of circumferentially spaced air jets 205 are located in the base and extend in a direction generally axially of the tube to propel hosiery therethrough. An air supply pipe 206 connects with the interior of bell 201 and supplies air jets 203 and 205. Such pipe connects with and is controlled by valve 196 which also controls the supply of air to previously described air jets 191 and 192.

The turner unit T is supported by a frame 207 which mounts air reservoir tank 197. A pair of legs 208 extending upwardly from the frame support bell 201 and similar pairs of legs 209 support tube 200, being secured thereto by a collar 210.

As shown in Figs. 1 and 2 the turner unit T is arranged to extend axially of form F with bell 201 facing the toe end of the form and located a sufficient distance outwardly therefrom as not to interfere with drawing of stockings on the form from holder H. When hosiery is stripped from the form the toe end is briefly retained by the collapsed gripping fingers 62 and 63. Where, as preferred, the stripping mechanism ST and the first jet device are provided, air jets 191 and 192 of the latter device propel the leg and top of the hosiery outwardly across the space between the toe end of the form and the bell 201 of the turner, where the bell jets 203 and 205 take over and propel the hosiery into an elongated condition in tube 200 with the top of the hosiery at the rear of the tube. In these operations the hosiery is turned from inside-out to right-side-out condition because of the engagement of the toe extremity by the gripping fingers on the form.

The second air reservoir tank 197, located in proximity to turner T, is provided in order to insure a rapid and adequate supply of air at forty pounds' pressure to the air jets which have been described through relatively short pipe connections and a minimum slowdown of flow from pipe friction between tank 197 and the jets. Tank 118 in stand S is relatively remote from the jets.

Toe release from form

While the turned hosiery can be manually released from the toe gripping fingers 62 and 63 and manually withdrawn from the turner unit for deposit in some receiver, it is preferred to provide automatic mechanism for effecting release of the form gripping fingers immediately after the hosiery has been stripped from the form and turned. This is accomplished, as earlier stated, by automatically briefly re-expanding the expanding parts of the form independently of pedal P-1 and the main inlet and exhaust valve 49 of the form expanding air motor 42. As in the first expansion of the form during hosiery inspection, re-expansion is effected by air motor 42, power transmitting rods 44, 46, arm 47 and rod 48. An auxiliary air supply circuit to the air motor is arranged to supply only sufficient air to briefly expand the toe gripping fingers and other expanding parts of the form so that they can be quickly collapsed again as soon as the hosiery toe has been released from the gripping fingers.

For the first expansion air is supplied to the form motor from air reservoir tank 118 through air pipe 211, the main motor control valve 49 and thence through air pipe 212 to the motor as best shown in Fig. 29. For re-expansion air is supplied from a short branch pipe 213 from the main air supply line 120 thence to a small tank 214 and through a further pipe 215 connecting with automatic control inlet valve Vc which constitutes one of a series located in the upper rear portion of stand S as shown in Fig. 2 and further shown in Fig. 29 and the automatic operation which will hereafter be explained in detail. Restricting means is provided in pipe 215 in the form of a fixed 1/16 inch orifice and/or a manually adjustable valve 216 so that only a limited quantity of air can pass through valve Vc from small tank 214 during its brief opening. From the valve the air is supplied through air pipe 217 and delivered to pipe 214 leading to the air motor 42.

As soon as inlet valve Vc closes, an automatic exhaust valve Ve, connecting through branch pipe 218 to pipe 217, is automatically opened to quickly exhaust the limited amount of air from air motor 42 so that the expanding parts of the form are quickly collapsed. The hosiery toe is clear of the gripping fingers 62 and 63 when this occurs.

During re-expansion and collapse of the form for toe release, the main motor valve 49 and pedal P-1 are locked out of operation by the locking action of latch 161 with bell crank 138, and air inlet valve 117 controlling servo-actuator 112 of the stripper mechanism remains inoperative by reason of the lost-motion connection between power transmitting rod 46 and rod 140 which controls the valve operation, all as previously explained.

Second air jet device

This device comprises a series of hosiery manipulating air jets arranged to insure quick release of the hosiery toe from the form gripping fingers 62 and 63 during the re-expansion operation just explained and to shift the hosiery foot to a new location. The same is particularly desirable where the hosiery after turning is to be automatically delivered to a receiver through a further handling unit. The same is best shown in Figs. 2 and 3.

A first air jet 220 is provided at a point above the toe of form F. For convenience it is here shown as mounted on top of bell 201 of the turning unit T to direct an air blast downwardly at an angle towards the form gripping fingers 62 and 63 when such fingers are re-expanded so that the hosiery toe is blown downwardly by the air stream. Located below the level of the form and turner T in a space between them is a small platform 221 which receives the released hosiery toe. Located on such platform at the rear edge thereof is a small tubular housing 222 provided with a pair of horizontally directed jets 223 and 224, the blast of which serves to propel the hosiery toe across the platform in a direction transversely of form F and turning unit T for pickup by further automatic handling mechanism.

Air is supplied from manifold 165 through an automatic inlet valve Vd and air pipe 225 to jets 223 and 224 and simultaneously through a branch air pipe 226 to air jet 220. The duration of the air blast from the jets need be only a fraction of a second.

Hosiery delivery mechanism

This mechanism comprises a separate unit D and is mounted by an elongated narrow vertical closed frame 230 having a length somewhat greater than the hosiery and arranged more or less transversely to the direction of the turning unit T and with it hosiery pickup end adjacent platform 221 of the air jet device just described. The unit is shown in Figs. 2, 3, 4, 20, 21 and 27.

On the front side of the frame as shown in Figs. 3 and 4 is a longitudinally movable hosiery delivery device including a lower set of rigid smooth metal fingers 231 and one or more similar coacting upper fingers 232 adapted to interfit in spaced relation between the lower fingers. Such fingers are adapted to frictionally clasp the toe of hosiery with sufficient firmness that the delivery device may pull the hosiery from the turning unit T to a receiver yet without damage to the hosiery.

The lower fingers are fixed to a tubular shaft 233. Within such shaft is a solid shaft 234 (Fig. 25) with which the upper finger is connected by arcuate slots (not shown) in the tubular shaft which permit limited relative turning movement of the shafts. Such shafts ride in a horizontal track slot 235 located near the top of the front wall of frame 230. Such shafts are mounted at their inner ends by the upper end of a reciprocating arm 236 located inside the frame and adapted to move the shafts and gripping fingers along slot 235 from one end to the other and back as will be clear from Figs. 4 and 27. In the upper portion of the frame back of arm 236 is a slotted cam track 237 horizontally aligned with shaft track slot 235 and having oppositely inclined cam end portions. A pair of crank-like actuating fingers 238 and 239 are secured at their inner ends to shafts 234 and 233, respectively, and have outer end portions laterally offset from the shaft which ride in slot 237 and which serve to turn the shafts and clasp fingers 231 and 232 relatively. In the position shown in Fig. 4, corresponding with Figs. 2 and 20, actuating finger 238 is on the inclined end portion of cam track 237 at the pickup end of the unit, causing elevation of upper finger 232. Finger 239 is in the horizontal portion of the track and holds lower clasp fingers 231 in substantially horizontal position. In such positions clasp fingers 231 and 232 are located in a cutout 240 (Fig. 2) in platform 221 to receive a hosiery toe when propelled across the platform by air jets 223 and 224.

When reciprocating arm 236 moves away from the pickup end of the frame, actuating finger 238 moves into the horizontal portion of cam track 237 to lower upper finger 232 and clasp the hosiery toe in coaction with the lower fingers 231. While the weight of upper finger 232 and its interfitting relation with the lower fingers is normally sufficient to insure adequate frictional clasping engagement with the hosiery toe, the end of the finger can be provided with a rubber tip 241 if found necessary as shown in Fig. 20. When the upper end of arm 236 reaches the opposite discharge end of the frame as shown in Fig. 27, actuating finger 238 remains in the horizontal portion of the cam track, while cam 239 rides up the inclined cam end portion of the cam track located at such end of the frame to drop lower cam fingers 231 from normal horizontal position. The grip of the fingers on the hosiery toe is thus released and the same falls downwardly for delivery into a receiver, whereupon the arm 236 returns to the pickup end of the frame and the parts reassume the positions shown in Figs. 2, 3, 4 and 20.

Rapid swinging movement of reciprocating arm 236 from the inlet end of the unit is effected by a long reciprocating air motor 242 mounted horizontally in frame 230. Secured to the outer end of the motor piston rod 243 is a transverse link 244 having at its lower end a pivotal connection 245 with an actuating rod 246. The opposite end of rod 246 has a pivotal connection 247 with arm 236 upwardly of the lower end thereof. The lower end of arm 236 is secured to a weight plate 248 which has a floating pivotal connection 249 with the inner end of a further arm 250. The opposite end of arm 250 has a pivotal mounting 251 in frame 230.

Air motor 242 of a conventional type has an interior spring (not shown) for retracting the piston rod when air pressure initially supplied to the left end of the motor is released.

To avoid shock when arm 236 reaches the opposite ends of the unit, a pair of conventional hydraulic snubbers or dashpots 252 and 253 are mounted near the opposite ends of the casing having swinging inclined arms 254 and 255 connecting with their snubbing structure through simple linkage shown in Fig. 4. A roller 256 mounted on arm 236 at the opposite ends of its path rides against arms 244 and 245 and depresses them against the cushioning action of the snubbers.

As the clasp fingers 231 and 232 grip a hosiery toe and move lengthwise along their path, the hosiery leg and top is gradually drawn out of turning unit T and drawn into an extended position overlying a receiver R in which the hosiery is deposited when the fingers release the toe at the discharge end of their path.

Receiver R includes a pair of metal roller support frame members 257 interconnected by cross-frame members 258 at the lower ends of their opposite legs as shown in Figs. 2 and 3. Supported by the frame members is a fabric cradle 259. Hosiery may be deposited directly therein or a wrap-up cloth may be draped on the cradle in which hosiery may be wrapped and removed from the cradle for convenient handling. In any event, hosiery will be deposited lengthwise and stacked, one article on top of another, say two dozen or more, and then taken to another mill department for further processing, such as pre-boarding in the case of nylon hosiery.

Auxiliary devices are provided to insure the proper stacking of successive articles of hosiery in receiver R by the delivery mechanism. A top guard rail 260 is mounted on the top of frame 230 to prevent hosiery from flying up as it is rapidly drawn along by fingers 231 and 232. Tamping means are also provided arranged to tamp each article of hosiery deposited in the receiver. Such means include a hosiery toe tamping element 261 of inverted V-shaped cross-section and more or less triangular lengthwise contour. Such element is mounted upon a vertically reciprocating arm 262 in a bearing 263 on the top of frame 230. Secured at its upper end to such arm and located inside frame 230 is an actuating arm 264, shown in Figs. 4 and 27. A further slotted arm 265 is slidably connected to the lower end of arm 264 through a bolt 266. A spring-backed cushion stop 267 is provided for engaging bolt 266 in the position of the parts shown in Fig. 4. The other end of slotted arm 265 has a pivotal connection 268 with cross-link 244 on motor piston rod 243.

A hosiery leg tamping element 269 of transverse inverted V-shape, best shown in Fig. 3, also is provided. Such element, likewise the toe tamping element 261, should be smooth so as to avoid possible damage to the hosiery. They may be satisfactorily formed of molded plastic sheet material. The leg tamping element is mounted at one end of vertically reciprocating arm 270. A short lever arm 271 is mounted by a pivotal connection 272 at one end of frame 230 and integral therewith is an upstanding branch lever arm 273 which is rapidly connected to the end of arm 270. Pivoted to the outer end of lever 271 is a vertical arm 274 and pivotally connecting with the lower end thereof is a horizontal arm 275 having a stationary pivot 276 at its opposite end in the frame. A short vertical arm 277 interconnects an intermediate portion of arm 275 with previously described reciprocating arm 250. A series of springs 278 anchored at their upper ends to the frame connect with an intermediate portion of rod 250 and serve to tension the various rods for the delivery device and the tamps against vibration.

As will be understood from Fig. 27, when air is supplied to the motor 242 to project the piston rod and cause clasp fingers 231 and 232 of the delivery device to draw hosiery over receiver R, toe and leg tamps 261 and 269 are raised upwardly above the path of the delivery device. When air is exhausted from the motor and the spring therein retracts the piston rod to return the parts to the position shown in Fig. 4, the tamping elements move downwardly into receiver R to the position shown in Fig. 3.

Motor 242 is automatically operated so that the delivery mechanism operates in timed sequence with the other hosiery handling mechanisms previously described. A control valve Vf, one of the series in stand S, is automatically opened for a fraction of a second at the proper time to supply air from manifold 165 to actuate open a diaphragm-operated air inlet valve 280 located in the left end of stand S through air pipe 281 as best shown in Fig. 29. A manually adjustable vent valve 282 is provided to permit air to gradually leak away from the valve diaphragm so that the valve can again close. Opening of the valve supplies full air pressure from pipe 199 through pipe 283 to valve 280 and into a small reservoir tank 284. Air from the tank is supplied through air pipe 285 to a short horizontal pipe 286 in frame 230. At the left end of such pipe is a ball check valve 287, seen in Figs. 4 and 27, from which air is delivered to the air motor through pipe 289.

The purpose of check valve 287 and tank 284 is to control the operating speed of the air motor. Such valve, as shown in Fig. 22, has a vertical bore 290 connecting at its lower end with a transverse inlet bore 291 and at its upper end with a transverse outlet bore 292. Threaded in the upper end of the valve body is a hollow plug 293 which is adjustable to limit the flow of air into the outlet bore. Threaded through the plug is an adjustable screw stop 294 of substantially smaller diameter. Threaded in a counterbore in the lower end of the valve body is a similar hollow plug 295 having the same inside diameter as bore 290. Threaded through such plug is an adjustable screw stop 296. Mounted for reciprocation in bore 290 is air check ball 297 of smaller diameter than the bore. When air is supplied to the valve the ball rides up into engagement with screw stop 294 to limit the flow of air to outlet bore 292 so that air builds up in the air motor gradually. When air is to be exhausted from the motor the ball drops against screw stop 296 to permit more rapid reverse flow of air from the motor out of the valve through inlet valve 29 into horizontal inlet pipe 286. Through this arrangement the operation of the air motor and parts operated thereby is slowed down on the hosiery delivery expansion stroke of the motor at about the midpoint of the path of the hosiery delivery device. The last half of the motor expansion stroke is slower with resulting less shock at the end of the stroke.

A ball type exhaust valve 298 for exhausting motor 242 connects with the right end of horizontal valve 286 as shown in Figs. 4 and 27 and further shown in Fig. 21. Air from the motor and pipe 286 is exhausted through such valve into a ported exhaust pipe 299. The valve has a pivoted actuating arm 300. Shoulder 300' of the arm depresses actuating pin 306 to unseat the ball and open the valve upon clockwise movement of arm 300. When the arm turns counterclockwise the ball and pin can rise under internal air pressure. See Fig. 21. A horizontal rod 301 connects at one end with link 244 on the motor piston rod and reciprocates therewith. At the left end of such rod is a roller 302 which engages valve arm 300 as the air motor approaches the end of its expanding stroke to open the exhaust valve so that air is vented from the motor in the position of the parts shown in Fig. 27. The ball check valve 287 between the motor and the exhaust valve operates as previously described. Thereupon the spring in the motor collapses the piston rod and the parts move back to the starting position shown in Fig. 4. The initial exhaust of air while roller 302 engages arm 300 sufficiently reduces the air pressure that during such movement a counterbalancing arm 303 on valve arm 300 will serve to hold the valve open. As the parts reach the starting position shown in Fig. 4 a valve closing finger 304 mounted at an intermediate point of rod 301 reversely actuates valve arm 300 to raise shoulder 300'. The valve is closed by the first rush of air pressure in pipe 286 from the supply on the next operating cycle.

*Automatic timing valve assembly*

This assembly and the essential parts thereof are shown in Figs. 1, 2, 3, 19, 23, 25 and 28, and the air circuit therefor is shown in Fig. 29. Its purpose is to automatically effect operation of the various stocking handling mechanisms other than the stripping mechanism in proper timed relation with each other and with the stripping mechanism. The latter has its own automatic controls which have already been described and certain of the controls of the present assembly have also been described without reference to the manner of their automatic operation.

The assembly includes a series of air control valves V$a$, V$b$, V$c$, V$d$, V$e$, V$f$ and V$g$ mounted in line in a chassis 310 in the upper rear portion of stand S. See Figs. 2 and 29, also Fig. 19. Such valves are automatically operated by a series of motor driven individual rotary cams, which open the different valves in proper timed relation with each other and permit them to close again when their function has been completed.

One of such valves V$d$, which appears at the rear of the chassis in Fig. 19 is shown in detail in Fig. 25. The same includes a valve body 311 having a lower chamber 312. In the upper part of the body is fitted an upper body section 313 and the same is secured in sealing relation with the main body by retaining plate 314 and a plurality of retaining bolts 315. An air inlet head 316 is threaded to the upper body section. It may be here noted with reference to Figs. 2 and 29 that the heads of valves V$a$, V$d$ and V$f$, all inlet valves, face in the direction of and connect with the air supply manifold 165 which is mounted in the chassis to the right of the valves as seen from the front. The heads of the other valves, inlet valve V$c$ and exhaust valves V$b$, V$e$ and V$g$, face away from the manifold for convenient connection with the air pipes which they control.

Communicating with the lower chamber 312 of valve V$d$ is a transverse exhaust bore 317. In the case of the inlet valves just mentioned these bores connect with air pipes to supply air from the manifold thereto. Valve V$d$ in Fig. 25 delivers air to supply pipe 225 which, as shown in Figs. 2 and 29, supplies air to hosiery manipulating jets 220 and 223. In the exhaust valves the bores open to the atmosphere. A movable valve element is mounted in the upper body section 313 having a valve stem 318 provided with longitudinal air passage grooves 319. Secured to the stem and coactive with a seat formed in said body section is a valve head 320. Adjustably threaded to the bottom of the stem is a flanged actuating head 321 through which the movable valve parts are raised to open position. Spring 322 is interposed between head 321 and the lower end of the upper body section to tension the movable parts downwardly. An actuating rod 323 extends through the lower end of the main body and is sealed by a gasket bushing 324. At the upper end of the rod is a head 325 coactive with head 321 on the valve stem. At the lower end of the rod is an actuating head 326 and the rod is tensioned downwardly by spring 327.

As seen in Figs. 19 and 28 there is secured to a support 328 on the valve body a pivoted actuating plate 329 having a cam engaging finger 330 and a laterally extending arm 331. The latter mounts a roller 332. Raising of the plate by engagement of a cam with the cam finger causes the movable valve parts to be raised to open position. As soon as the cam rotates past the plate it moves downwardly and the valve parts quickly close. Such closing is rapid because of the air pressure in the upper portion of the valve acting against valve head 320. Referring particularly to Fig. 28 in connection with Fig. 19, it will be understood that valves V$a$, V$b$, V$c$, V$d$, V$e$, V$f$ and V$g$ are respectively actuated by separate cams $a$, $b$, $c$, $d$, $e$, $f$ and $g$ secured beneath the respective valves in axially spaced relation on cam shaft 333. Such cam shaft and the valve operating parts just referred to are mounted in chassis 310. In Fig. 2 they are located immediately below and are hidden by the line of valves V$a$, V$b$, V$c$, V$d$, V$e$, V$f$ and V$g$. The position of shaft 333 is shown in Fig. 1.

Cam shaft 333 makes one revolution for each cycle of the entire handling apparatus. It is driven by a constantly running electric motor 334 which appears in Fig. 1 through a speed reducing drive shown in detail in Fig. 23. Pulley 335 on the motor shaft through belt 336 drives pulley 337 having clutch connection with a further pulley 338. A belt 339 from pulley 338 drives a large pulley 340 on an upper shaft 341. A small pulley 342 on the same shaft through belt 343 drives large pulley 344 on cam shaft 333. An automatically controlled clutch similar to that employed in the stripping mechanism is employed. On the shaft with pulley 337, which is hidden by journal box 345, is a friction clutch plate 346 adapted to make clutching engagement with the face of pulley 337 through axial movement of the shaft in a direction from front to rear of the chassis. When the shaft moves forwardly, a rotary friction brake disc 347 engages a stationary brake disc 348 to quickly stop rotation of the cam shaft.

The clutch shaft is normally held in its non-driving forward position by a hidden spring in a conventional manner. It is moved to clutching position by a diaphragm type servoactuator 349 through air pressure. As shown in Fig. 29 such actuator is connected through air inlet pipes 350 and 351 with automatic control valve 123. As earlier explained valve 123 is briefly opened simultaneously with valve 117 of the stripper mechanism when power transmitting rod 46 approaches the right end of its stroke during the collapse of form F when the heel of pedal P-1 is depressed by the inspector at the end of hosiery inspection. Thus the timing cycle of the cam-operated valve assembly is initiated simultaneously with the stripping cycle. An exhaust valve Vg connects through pipes 352 and 353 with actuator 49 to release the pressure therefrom and release the clutch and cause the brake to stop the cam shaft at the end of one revolution. A manually adjustable pressure relief valve 354 vents a portion of the full forty-pound operating pressure from actuator 349 during operation so that the actuator vents quickly when valve Vg briefly opens. Pressure is shown by pressure gauge 355.

Inlet valve Va and exhaust valve Vb control air jets 223 and 224 on tube 190 beneath form F and jets 220 and 222 of turner unit T. Valve Va supplies air to a diaphragm type servo-actuator 356 through pipe 357 which also connects with exhaust valve Vb through branch pipe 358. See Fig. 29. As shown in Fig. 1 arm 359 of actuator 356 connects through rod 360 with a pivoted actuating arm 361 of valve 196. As shown in Fig. 26 arm 361, through a finger 363, acts to turn main valve actuating arm 361'. Pressure in the actuator moves both valve arms downwardly to open the valve so that pressure is supplied to the jets from tank 197. When pressure is released from the actuator spring 362 raises the valve arm to close the valve. Arm 361' can be depressed independently of arm 360 and the actuator as hereafter explained.

Inlet valve Vc and exhaust valve Vb control the re-expansion and collapse of form F for release of the hosiery toe from the form fingers as earlier explained, and it has just previously been pointed out that valve Vg terminates operation of the valves after one revolution of their operating cams. While valve Vg is open inlet valve Vf is briefly opened to cause air to be supplied to delivery mechanism D under control of diaphragm-operated valve 280. While valve Vf is closed before the end of their cycle, valve 280 remains open until the pressure on its diaphragm is vented by valve 282. Because of this and the presence of tank 284 and, despite the slow supply of air through ball check valve 287, sufficient pressure is supplied to cause the stocking delivery mechanism D to operate after the end of the cam cycle until it has delivered the hosiery article to the stocking receiver R.

It will be understood that the time each of the valves Va, Vc, Ve, Vb, Vg, Vf and Vd remain open is determined by the arcuate length of the corresponding actuating cams a, c, e, b, g, f and d and that the time the valves operate to produce operation of the various hosiery handling mechanisms in proper timed relation to each other is determined by the circumferential position of the cams around cam shaft 333. In Fig. 28 the various cams are shown diagrammatically to illustrate their relationship. In various instances it will be noted that the operating periods overlap since it is necessary that valves for different units be opened at the same time. The length of the cams of the individual handling mechanisms may be varied as required to produce proper operation and the over-all handling cycle may be varied by adjusting the rotating speed of the cam shaft.

Form position safety controls

Form F is mounted for rotation so that it can be turned for inspection of both sides of hosiery thereon. Because the form is flat the stripping mechanism ST can only function when the form is horizontal. Safety controls are provided to lock pedal P-1 and prevent collapsing of the form and prevent the automatic controls from operating any of the handling mechanisms when the form is not horizontal, thereby insuring against damage of the stripping mechanism or other parts. The safety controls are only partly seen in Fig. 1, but are shown in detail in Figs. 5, 8 and 9.

A circular cam 370 is mounted on hub 371 at the base of the form to turn therewith in supporting bushing 40 as shown in Fig. 9. At diametrically opposite sides of the cam in the plane of the form are cam recesses 372 and 373. A roller 374 coacting with the cam is mounted upon a supporting rod 375. Such rod is slidably supported for lengthwise movement by lug 376 which projects from bracket 41 at the forward side of stand S. The rear end of rod 375 connects with one arm of bell crank 377 pivotally mounted upon a further lug 378. When form F is in proper horizontal position with the form expanded and with either side up at the end of inspection ready for the stripping operation, rollers 374 will seat in one or the other of cam recesses 372 and 373. Turning of the form causes the roller to ride up on the circular peripheral surface of the cam and move rod 375 rearwardly to rotate bell crank 377 slightly counterclockwise.

The second arm of bell crank 377 connects with a long circular rod 379 which extends across the front of stand S. As shown in Fig. 5 the left end of rod 379 connects with one arm of a further bell crank 380 pivotally mounted on the front of the stand. A vertical rod 381 connects with and extends downwardly from bell crank 380 and at its lower end connects with a bell crank 382 having a pivotal connection 383 with the lower frame of the stand adjacent the main intake and exhaust valve 49 of the form operating air motor. As best shown in Fig. 8 the lower arm 384 of bell crank 382 has a latch shoulder 382' adapted when moved inwardly to engage square finger 386 on the side of valve arm 51 and prevent depression of the heel of pedal P-1 after the form has been expanded by depressing the toe of the pedal. This prevents exhaust of the form motor through valve 49. The form cannot be collapsed to open valves 117 and 123 and the automatic handling cycle is not initiated. Through the linkage referred to latch arm 384 will be moved to its locking position whenever form F is turned so that roller 374 is on the circular surface of cam 370. When the form is flat and the roller is in one of the recesses 372 and 373 latch arm 384 is drawn forwardly to release valve arm 51 and pedal P-1.

Long rod 379 in the operating linkage for the latch mechanism just described has a further function. Formed integrally with rod coupling member 45 on power transmitting rod 46 which expands the form is a U-shaped member 387. Extending between the arms thereof is a recessed latch arm 388 formed integrally with plate 389. Pivotal connection 390 mounts plate 389 on the front of the stand, all as shown in Fig. 5. A counterweighted arm 391 integral with plate 389 urges the plate clockwise to hold latch arm 388 out of locking engagement with member 387. Rotation of the plate counterclockwise lowers latch arm 388 into locking engagement with member 387 and thereby immobilizes power rod 46. Such movement is controlled by a short rod 392 having pivotal connection 393 at one end with plate 389 and connected at its other end by a collar 394 with rod 379. Counterweighted arm 391 acts through rods 392, 379 and 375 to hold rotary 374 against cam 370 and urge roller 374 into recesses 372 and 373, when aligned therewith. When the form is turned to force the roller from one of the recesses onto the circular portion of the cam and the rods move to the left, plate 389 is tilted counterclockwise to effect the described latching engagement of arm 388 with member 387 on power rod 46. This occurs simultaneously with the locking action of latch arm 384 already explained. When the form is turned to horizontal position both of these safety locks are released so that the form in various handling mechanisms may be operated through their regular controls. Latch arm 388 has a shoulder 395 which coacts with member 387 to lock rod 46 with the form expanded and has a shoulder recess coacting with member 387 to lock the form in collapsed condition.

*Control for manual stripping of defective hosiery*

Defective articles of hosiery are not delivered to receiver R and are not automatically handled by the handling mechanisms. Provision is made for the inspector to prevent operation of the various automatic controls so that form T may be collapsed independently thereof and the defective hosiery stripped from the form manually and deposited on the top (not shown) of stand S. Controls for such purpose are shown in Figs. 1, 5 and 8.

A further pedal P–2 is provided. When depressed such pedal opens an exhaust valve 400 connecting through exhaust pipe 401 with pipe 212 of the form motor to exhaust the motor independently of its main inlet and exhaust valve 49. The pedal connects through rods 402 and 403 with swinging rearwardly extending actuating arm 404 of valve 400 to accomplish this purpose.

Pedal P–2 is also operative simultaneously to control the movement of pedal P–1 and prevent accidental initiation of the automatic cycle of the handling mechanism. Connecting with the forward end of pedal P–2 is an upstanding rod 405 which connects at its upper end with one arm of a bell crank 406 having a pivotal connection 407 on the underframe of the stand. The other arm of the bell crank connects through a horizontal rod 415 with a vertical arm 408 mounted for vertical movement by a pivotal connection 409 on the framing. On the lower portion of arm 408 is a hook-shaped guiding and locking cam 410. On the actuating arm of valve 49 is an integral rear extension 411, best shown in Fig. 8. Secured to the rear portion of such extension is a bar 412 having a reduced finger 413 at its rear end and having slot and screw connections with extension 411 for vertical adjustment thereon. Under movement of valve actuating arm 51 finger 413 rides up and down in a guide slot in a stationary vertical arm 414 secured at its upper end to the framing behind arm 408.

Referring to both Figs. 5 and 8, it will be understood that when the form is expanded the toe of pedal P–1 is in depressed position and valve arm 51 is tilted. At such time finger 413 is at or near the upper end of the slot in arm 414. When, now, the heel of pedal P–2 is depressed arm 408 swings clockwise. Hook portion 410 thereof rides against the upper surface of finger 413 and forces the same downwardly until valve arm 51 is turned to horizontal position in which both the inlet and outlet elements of valve 49 are closed. The valve arm and pedal P–1 are locked against operation until pedal P–2 is released, when a counterweight arm swings arm 408 counterclockwise out of engagement with finger 413.

*Operation*

The operation of the machine will be understood by reference to Fig. 2 in conjunction with Figs. 30 through 34. The inspector, seated in front of the left of stand S, draws an article of hosiery from holder H, the fingers of both hands gripping the top of the article, and slides it over form F. Her toe depresses the toe of pedal P–1 and the form expands. The hosiery is inspected on one side and then the form is turned over manually for inspection of the other side.

If the article is found defective pedal P–2 is depressed with the right foot to neutralize the automatic handling mechanism by taking over control of the parts actuated by pedal P–1. The form collapses and the inspector withdraws the article from the form manually and places it on the top (not shown) of the stand S. Pedal P–2 is released to again render pedal P–1 operative for inspection of the next article of hosiery.

If, with the form expanded, an article of hosiery is found perfect; the inspector depresses the heel of pedal P–1. The form collapses from the expanded condition shown in Fig. 30 and the automatic controls for the stocking handling mechanisms are activated. The stripper element 80 strips the article from the form as shown in Fig. 31 and the air jets on tube 190 are activated to propel the article outwardly beyond the toe end of the form to turning unit T. The jets in the turning unit are also activated and elongate the article therein. The article is turned right-side-out in the course of these movements due to the grip of the toe extremity by the collapsed gripping fingers 62 and 63 of the toe expanding elements of the form. The air jets of the turning unit and on tube 190 are cut off. Fig. 32 shows the article ready for further automatic manipulation. Air jets 220 and 222 are activated and the form is automatically re-expanded to release the grip of the fingers on the toe of the article. The blast of air from jet 220 propels the foot of the article downwardly into the transverse path of air from jets 222 and 223. The blast from the latter jets propels the toe of the article across platform 21 and between clasp fingers 231 and 232 of delivery mechanism D as shown in Fig. 33. The form quickly collapses again. Prior to the re-expansion of the form, incident to the collapse of the form at the end of inspection, the heel of pedal P–1 is automatically raised slightly to neutral position and the control parts which it actuates are locked against operation.

As soon as the toe of the hosiery article reaches fingers 231 and 232 of the delivery mechanism, the fingers are automatically closed and the fingers are propelled rapidly to the discharge end of the delivery mechanism, drawing the article out of the turning unit and into elongated condition over receiver R. The tamps 261 and 269 are raised automatically out of the path of the fingers and the article. Air jets 220 and 222 stop their blast after the article has been delivered to the delivery fingers.

As soon as the delivery fingers reach the discharge end of their path they are automatically spread apart to release the hosiery toe. This stage is shown in Fig. 34. The article drops down into receiver R and the delivery fingers are quickly moved back to the pickup end of the delivery mechanism and are automatically opened ready for the next hosiery article. Tamps 261 and 269 move down on top of the toe and leg of the article in the receiver. The automatic hosiery handling cycle is now completed, the article having been removed from the form, and deposited in the receiver without manual handling by the inspector and without manual manipulation of any controls. The entire apparatus is in condition for inspection and handling of the next hosiery article.

Not only does the automatic hosiery handling mechanism relieve the inspector from manual operations and mental attention in removing hosiery from the inspecting form, turning it and depositing it in a receiver; but such apparatus handles the hosiery more rapidly than could be done by the inspector. The complete cycle of the stripping mechanism requires only about ¾ of a second and of this only about ⅜ of a second is required for the stripping of the stocking from the form. By the time the stripping mechanism has stopped, the hosiery has been turned and released from the toe fingers and the toe has been transferred to the fingers of the delivery mechanism. The cycle of the automatic timing valve assembly, which is initiated simultaneously with the stripping cycle, is only one second. The delivery mechanism begins operation within about 1½ seconds. The delivery device delivers the hosiery to the receiver in about one second and returns it to its starting position in another second. The total time for the removal of hosiery from the form and delivery into the receiver is about 3½ seconds, and at the end of about 4½ seconds the delivery mechanism is out of operation and the apparatus is ready for the next article of hosiery. In the latter connection it may further be pointed out that an experienced inspector can draw another article of hosiery on the form before the delivery mechanism has ceased operation. In any event experience has shown that skilled inspectors can inspect around 200 dozen articles of hosiery per day, a volume which is substantially higher than is possible without the automatic handling apparatus.

Figure 35:
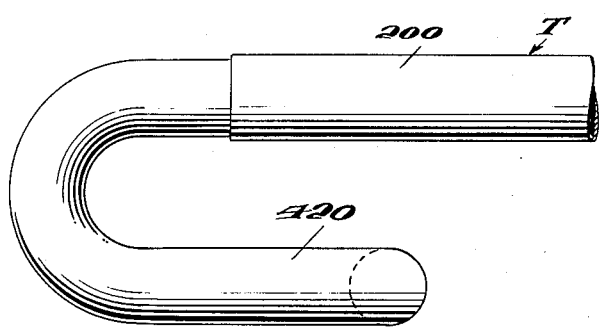
Fig. 35 is a fragmentary top plan view of a modified hosiery turning mechanism designed to discharge hosiery to dye nets instead of to the stocking delivery mechanism and stocking receiver shown in Figs. 2, 3, 4 and 27.
Figure 36:
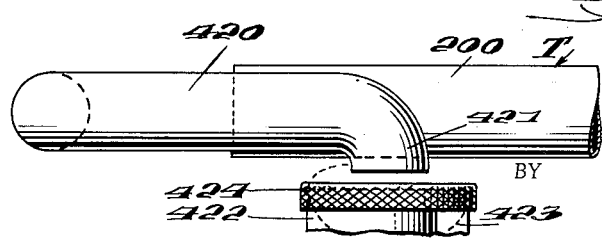
Fig. 36 is a fragmentary side elevation corresponding to Fig. 35.

*Alternative operation*

Where hosiery is to be dyed after inspection it may be delivered directly after turning to a dye net instead of being stacked in receiver R. The stocking handling apparatus is modified for this purpose to dispense with the stacking delivery mechanism unit D and provides a different delivery unit shown in Figs. 35 and 36. Such delivery unit is in the form of a U-shaped tube 420 telescopically fitted on the rear end of tube 200 of turning unit T. Such delivery unit has a downwardly facing discharge end 421 adapted to deliver inspected hosiery into a portable bag receiver 422 supported by a suitable frame 423. A dye net 424 is shown draped in the mouth of the receiver. When such net is filled with hosiery it can be dropped into the bag and another net installed to receive further hosiery.

With the described modified delivery apparatus the hosiery will again be automatically stripped from the form and turned and the form automatically re-expanded to release the hosiery toe with or without assistance of automatic air jet 220. When the toe is released the air jets in the turner unit will propel the stocking through the U-shaped delivery unit 420 for automatic delivery to bag receiver 422. In this case control valve V$a$ must remain open to maintain the turner jets until after expansion of the toe gripping fingers and a longer operating cam $a$ will be required.

Other variations of the handling apparatus are also possible to suit requirements of individual hosiery mills and to provide cheaper apparatus. Since the automatic valve controls operate independently of the stripping mechanism, apparatus may be supplied without the latter unit. Manual stripping of hosiery from the form is feasible with automatic handling thereafter for either stacking or bagging. Also the stripping mechanism and turning mechanism with their automatic controls may be found satisfactory with manual delivery of hosiery from the turner to a receiver. The stripping mechanism can be supplied without the other handling apparatus. Other sub-combinations of the automatically controlled handling mechanism are also possible, although providing less speed and efficiency in the inspecting operation.

*Handling accessories*

A counter for counting inspected hosiery articles in the course of automatic handling may be provided. Such a device C is shown in Figs. 1, 2 and 3. The same is conventionally mounted beside the inspector by supporting rods secured to the framed air tank 197 which supplies the air jets of the turning unit. Automatic operation of the counter is effected by diaphragm servo-actuator 356 which operates such valve. A counter actuating swinging rod 431 fixed to valve actuating arm 361 of the valve 196 of the turner may be connected through suitable operating linkage with the counter to actuate the counter upon each actuation of the valve arm. See Fig. 26. A second manually operated swinging rod is rigidly mounted on valve arm 361' which through linkage permits the counter to be reset and permits arm 361' to be actuated open for testing the turner jets independently of arm 360 and actuator 356. The counter itself is of conventional rotary dial type commonly employed for hosiery counting with manual operation.

An earlier mentioned arrangement may be made for automatic elevation of hosiery tray H in lieu of foot operation through pedal P-3. This is shown in Fig. 5 and part thereof can be seen also in Fig. 2. Extending upwardly from pedal P-3 is a connecting rod 435, the upper end of which connects with a large bell crank 436 pivotally mounted on the front of stand S. Pivoted to the upper end of the bell crank is a latch arm 437 which is received between a U-shaped upper portion 438 of collar 155 on power transmitting rod 46. Cam nose portion 439 of latch arm 437 is normally engaged by pin 441 on vertical arm 440. Such arm is secured to a longitudinally movable horizontal rod 442 supported on the upper front portion of stand S. The right end of rod 442 connects with a manually operated lever arm 443 which is pivoted by a bolt 444 in a stationary bracket near the right end of the stand S.

In the position shown in Fig. 5 latch arm 437 is in an inoperative position. When rod 46 moves to the left on its form expanding stroke, the body of collar 155 rides beneath the latch arm and U-shaped upper portion 438 of the collar merely slides along the arm. When automatic step-by-step raising of hosiery holder H is desired, manual lever 443 is pulled to the left to draw rod 442 and arm 440 to the right. Pin 441 is thus moved to the end of cam nose 439 of latch arm 437 with the result that the arm is lowered into position to engage collar 155. Under such conditions, each time rod 46 moves to the left on its form expanding stroke, latch arm 437 moves with it and actuates bell crank 436 and rod 435 to depress pedal P-3. Each depression of such pedal raises tray holder H through operating mechanism earlier described.

It will be evident to those skilled in the art that the detailed operating parts in the various units of the apparatus illustrated are capable of a considerable range of modification and equivalency. Their essential functions may otherwise be carried within the scope of the invention. Accordingly the scope of the invention is to be determined from the appended claims.

I claim:

1. Hosiery inspecting and handling apparatus comprising an expansible hosiery inspecting form including a toe supporting end having laterally expansible toe engaging members, said members having opposing toe gripping fingers adapted when collapsed from expanded condition to make gripping engagement with the toe of hosiery, actuating means for expanding and collapsing the form, controlling means for said actuating means, manually operable means for operating said controlling means to effect expansion and collapse of the form, means for stripping hosiery from the form comprising a stripper member, power-operated endless belt means extending parallel to the inspecting form mounting the stripper member for movement in a stripping path lengthwise towards the toe end of the form in engagement with the form and in a return path spaced from the form, first air jet means adapted to push hosiery from the form outwardly beyond the toe end of the form while said gripping fingers grip the hosiery toe, air jet hosiery turning mechanism located in outwardly spaced longitudinal relation to the toe end of the form adapted to receive stripped hosiery from said air jet means, and automatic control means operative to successively collapse the form, activate the power-operated belt means of the stripping mechanism, supply operating air pressure to said first air jet means and to the air jet turner mechanism, and expand and contract the form for hosiery release by said toe gripping fingers.

2. Hosiery inspecting and handling apparatus according to claim 1, further including actuating means operating upon collapse of the form to initiate operation of the automatic control means.

3. Hosiery inspecting and handling apparatus according to claim 1, further including air jet means adapted to eject the toe of the hosiery from said toe gripping fingers while such fingers are expanded, hosiery delivery mechanism adapted to deliver hosiery to a receiver including hosiery clasp fingers reversely movable in a path between a pickup point at which said clasp fingers receive the toe of hosiery from said last-named air jet means and a discharge point.

4. Hosiery handling and inspecting apparatus according to claim 1, further including an operating member reversely movable upon expansion and collapse of the form, actuating means actuatable by said operating member to initiate operation of said automatic control means and selective control means for effecting operation of said actuating means by said operating member and for preventing operation of said actuating means by said operating member upon form expanding movement.

5. Hosiery inspecting and handling apparatus according to claim 1, further including actuating means operating in response to collapse of the form by the manually operable means to initiate operation of the automatic control means and independent control means for rendering said automatic control means inoperative when the form is expanded.

6. Hosiery inspecting and handling apparatus according to claim 1, further including actuating means operating in response to collapse of the form through the manually operable means to initiate operation of the automatic control means and independent control means operative to effect collapse of the form, to render said actuating means inoperative to initiate operation of the automatic control means during said so effected collapse of the form and to render the manually operable means inoperative to effect collapse of the form.

7. Hosiery inspecting and handling apparatus according to claim 1, further including actuating means operating in response to collapse of the form through the manually operable means to initiate operation of the automatic control means and second manually operable means operative to prevent collapse of the form through the first pedal means and operative to effect collapse of the form and prevent operation under said so effected collapse of the form of said actuating means for the automatic control means.

8. Hosiery inspecting and handling apparatus according to claim 1, wherein the form is mounted for axial turning movement, and further including control means operative to prevent operation of the automatic control means except when the form is turned to a predetermined position.

9. Hosiery inspecting and handling apparatus according to claim 1, wherein the automatic control means for supplying operating air pressure comprises a series of air control valves, power-operated cam means for selectively operating said valves, and control means operating in response to collapse of the form to activate said power-operated cam control means.

10. Hosiery inspecting and handling apparatus comprising a hosiery inspecting form, a hosiery stripping member extending transversely of the form and supported for movement longitudinally thereof, and power-operated means for moving the stripping member in a stripping path lengthwise along the form in engagement therewith to strip hosiery from the form.

11. Hosiery inspecting and handling apparatus comprising an expansible hosiery inspecting form, a hosiery stripping member extending transversely of the form and supported for movement longitudinally thereof, power-operated means for moving the stripping member along the form in engagement therewith to strip hosiery from the form, and control means operative to activate said power-operated means automatically upon collapse of the form from expanded condition to start stripping operation of the stripping member.

12. Hosiery inspecting and handling apparatus comprising an expansible hosiery inspecting form, a member movable by collapse of the form from expanded condition, a power-operated hosiery stripping member movable relative to the form to strip hosiery from the form, and automatic control means responsive to movement of said movable member during collapse of the form to activate said hosiery stripping member.

13. Hosiery inspecting and handling apparatus comprising an expansible hosiery inspecting form, actuating means for expanding and collapsing the form, power-operated hosiery stripping mechanism including a member movable along the form in engagement therewith to strip hosiery from the form, and automatic control means for successively collapsing the form and actuating the power-operated means to start stripping operation of the stripping member.

14. Hosiery inspecting and handling apparatus comprising an expansible hosiery inspecting form, an actuating means for expanding and collapsing the form, power-operated hosiery stripping mechanism including a member movable along the form in engagement therewith to strip hosiery from the form, and selectively operative control means operative upon collapse of the form to cause the form actuating means to activate the hosiery stripping mechanism and upon expansion of the form to render the hosiery stripping mechanism inoperative.

15. Hosiery inspecting and handling apparatus comprising an expansible hosiery inspecting form, actuating means for expanding and collapsing the form, manually operable control means for the form actuating means, power-operated hosiery stripping mechanism including a member movable along the form in engagement therewith to strip hosiery from the form, and selectively operative control means operative to activate the hosiery stripping mechanism upon collapse of the form from expanded condition, said selectively operative control means being operatively connected with said manually operable control means for the form to be rendered inoperative thereby upon expansion of the form.

16. Hosiery inspecting and handling apparatus comprising an expansible hosiery inspecting form, actuating means for expanding and collapsing the form, manually operable control means for the form actuating means, power-operated hosiery stripping mechanism including a member movable along the form in engagement therewith to strip hosiery from the form, an actuating member actuatable by the form actuating means to initiate operation of the hosiery stripping mechanism, and control means for said actuating member operatively connected to the manually operable control means for the form to effect actuation of said actuating member in form collapsing position of said manually operable control means and to prevent actuation of said actuating member in form expanding position of said pedal control means.

17. Hosiery inspecting and handling apparatus comprising a flat hosiery inspecting form, hosiery stripping mechanism including a hosiery stripping member, a power-driven belt extending longitudinally of the form and mounting the stripping member for movement in a stripping path lengthwise of the form in engagement therewith, and control means for starting and stopping said power-driven belt.

18. Hosiery inspecting and handling apparatus comprising an expansible flat hosiery inspecting form, actuating means for expanding and contracting the form, hosiery stripping mechanism including a stripping member, a power-driven belt mounted longitudinally of the form mounting the stripping member for movement lengthwise of the form for movement in a stripping path lengthwise of the form and in engagement therewith, control means for starting operation of the stripping mechanism upon collapse of the form, and further control means responsive to movement of said belt to a predetermined position to stop operation of the stripping mechanism.

19. Hosiery inspecting and handling apparatus comprising a hosiery inspecting form, a hosiery stripping member extending transversely of the form and supported for movement longitudinally thereof, power-operated actuating means operative to drive said stripping member from a rest position spaced from the form along the form in engagement therewith to strip hosiery from the form, control means for starting operation of said power-operated actuating means, and further automatic control means for stopping said power-operated actuating means with the stripping member in its rest position.

20. Hosiery inspecting and handling apparatus comprising an expansible hosiery inspecting form, actuating means for expanding and collapsing the form, a hosiery stripping member extending transversely of the form and supported for movement longitudinally thereof, power-operated actuating means operative to drive said stripping member from a rest position spaced from the form along the form in engagement therewith to strip hosiery from the form, and automatic control means operative to start operation of said power-operated actuating means upon collapse of the form and to stop said power-operated actuating means with the stripping member in its rest position.

21. Hosiery inspecting and handling apparatus comprising a flat hosiery inspecting form, a support mounting the form for axially turning movement to and from a predetermined plane, power-operated stripping mechanism for stripping hosiery from the form adapted to move a stripper in a stripping path lengthwise of the form in engagement therewith when the form is in said predetermined plane to strip hosiery from the form and control means operative to prevent operation of said stripper when the form is tilted on its axis with respect to said predetermined plane.

22. Hosiery inspecting and handling apparatus comprising a flat hosiery inspecting form, a support mounting the form for axially turning movement to and from a predetermined plane, hosiery stripping mechanism including power-driven endless belt means extending along the form, a stripping member mounted on said belt means for movement in a stripping path lengthwise of the form in engagement therewith when the form is in said predetermined plane to strip hosiery from the form, and control means operative to prevent operation of the stripping mechanism when the form is tilted on its axis with respect to said predetermined plane.

23. Hosiery inspecting and handling apparatus comprising a flat expansible hosiery inspecting form, a support mounting the form for axial turning movement to and from a predetermined plane, actuating means operative to expand and collapse the form, power-operated mechanism for stripping hosiery from the form including a member beside the form arranged to move in a stripping path lengthwise of the form in an engagement therewith when the form is in said predetermined plane to strip hosiery from the form, control means for activating the stripping mechanism upon collapse of the form from expanded condition and further control means operative to prevent collapse of the form when the form is tilted on its axis with respect to said predetermined plane.

24. Hosiery inspecting and handling apparatus comprising a hosiery inspecting form, power-operated hosiery stripping mechanism including a stripping member movable longitudinally of the form to strip hosiery lengthwise of the form to the toe end of the form, and air jet means arranged to direct air streams along the toe end of the form to propel hosiery outwardly beyond the toe end of the form.

25. Hosiery inspecting and handling apparatus comprising a hosiery inspecting form, power-operated hosiery stripping mechanism including a member movable longitudinally of the form to strip hosiery therefrom, and hosiery turning means disposed at the toe end of the form, said mechanism and said means operating successively to strip hosiery lengthwise from the form and to turn the stripped hosiery.

26. Hosiery inspecting and handling apparatus comprising a hosiery inspecting form, power-operated hosiery stripping mechanism beside the form to strip hosiery lengthwise from the form, and air jet means arranged to direct air streams along the toe end of the form to propel the stripped hosiery outwardly beyond the form and turn the hosiery in the course of the propelling movement.

27. Hosiery inspecting and handling apparatus comprising a hosiery inspecting form, power-operated hosiery stripping mechanism beside the form to strip hosiery lengthwise from the form, hosiery turning mechanism located in outwardly spaced relation to the toe end of the form, and air jet means arranged to direct air streams along the toe end of the form and propel hosiery from the form to the hosiery turning mechanism.

28. Hosiery inspecting and handling apparatus comprising a hosiery inspecting form, power-operated hosiery stripping mechanism beside the form to strip hosiery lengthwise from the form, hosiery turning mechanism including a hosiery receiving tube extending from the toe end of the form, air jet means arranged to direct air streams along the toe end of the form and propel hosiery through the tube and turn the hosiery in the course of propulsion, and further air jet means arranged to direct air streams into said tube and propel hosiery from the form into said tube.

29. Hosiery inspecting and handling apparatus comprising an expansible hosiery inspecting form, power-operated actuating means for expanding and collapsing the form, power-operated stripping mechanism beside the form adapted when the form is collapsed to strip hosiery lengthwise from the form, hosiery turning means automatically operative to turn hosiery after stripping from the form by said stripping mechanism, and automatic control means operating upon collapse of the form to activate said hosiery stripping mechanism and said hosiery turning means.

30. Hosiery inspecting and handling apparatus comprising a hosiery inspecting form having laterally expansible opposing gripping fingers adapted when collapsed to grip the toe of hosiery on the form, hosiery stripping mechanism beside the form adapted when the form is collapsed to strip hosiery lengthwise from the form, and power-operated actuating means for expanding and collapsing said gripping fingers and automatically operative after the hosiery stripping operation by the stripping mechanism to expand the gripping fingers to effect release of the hosiery toe.

31. Hosiery inspecting and handling apparatus comprising a hosiery inspecting form having laterally expansible opposing gripping fingers adapted when collapsed to grip the toe of hosiery on the form, hosiery stripping mechanism beside the form adapted when the form is collapsed to strip hosiery lengthwise from the form, hosiery manipulating means adapted to propel stripped hosiery outwardly beyond the toe end of the form while the toe of the hosiery is gripped by said gripping fingers of the form, and power-operated actuating means for expanding and collapsing the gripping fingers automatically operative to expand the gripping fingers to effect release of the hosiery toe after the hosiery has been propelled beyond the toe end of the form by said manipulating means.

32. Hosiery inspecting and handling apparatus comprising a hosiery inspecting form having laterally expansible opposing gripping fingers adapted when collapsed to grip the toe of hosiery on the form, power-operated hosiery stripping mechanism beside the form to strip hosiery lengthwise from the form when the gripping fingers are collapsed in gripping engagement with the hosiery toe, power means adapted to propel stripped hosiery outwardly beyond the toe end of the form and to turn the hosiery in the course of the propelling movement while the hosiery toe is gripped by said gripping fingers, and power-operated actuating means for expanding and collapsing the gripping fingers automatically operative after turning of the hosiery to expand the gripping fingers to effect release of the hosiery toe.

33. Hosiery inspecting and handling apparatus according to claim 32, further including air jet means operative while the gripping fingers are expanded to propel the hosiery toe out of the gripping fingers.

34. Hosiery inspecting and handling apparatus according to claim 32, wherein the power means for propelling and turning the stripped hosiery include hosiery propelling air jet means, and further including additional air jet means operative while the gripping fingers are expanded to propel the hosiery toe out of the gripping fingers.

35. Hosiery inspecting and handling apparatus comprising a hosiery inspecting form, hosiery turning means located in outwardly spaced relation to the toe end of the form, and air jet delivery means arranged to direct air streams from the toe end of the form toward said turning means to deliver hosiery from the toe end of the form to the hosiery turning means.

36. Hosiery inspecting and handling apparatus according to claim 35, wherein the hosiery turning means comprises a tube aligned with said form.

37. Hosiery inspecting and handling apparatus comprising a hosiery inspecting form, hosiery turning means including a hosiery receiving tube extending outwardly from the toe end of the form, air jet means arranged to direct air streams into the tube to propel hosiery through the tube and to turn the hosiery in the course of propulsion, and further air jet means arranged to direct air streams from the toe end of the form toward said tube to deliver hosiery from the toe end of the form to said tube.

38. Hosiery inspecting and handling apparatus comprising an expansible hosiery inspecting form including laterally expansible opposing gripping fingers adapted when collapsed to grip the toe of hosiery on the form, power hosiery turning means located beyond the toe end of the form adapted to receive hosiery from the form and turn the hosiery, power-operated actuating means for expanding and collapsing the form, and automatic control means operative after turning of hosiery by the turning means to effect expansion of the form by the form actuating means for release of the hosiery toe by the gripping fingers.

39. Hosiery inspecting and handling apparatus according to claim 38, further including air jet means automatically operative during expansion of the form to propel the hosiery toe out of the gripping fingers.

40. Hosiery inspecting and handling apparatus according to claim 38, further including hosiery transporting means automatically operative after turning of hosiery and release of the hosiery toe from the gripping fingers to deliver and discharge the hosiery at a discharge station.

41. Hosiery inspecting and handling apparatus according to claim 38, further including hosiery delivery mechanism having its pickup end spaced from the hosiery turning means, air jet means automatically operative after turning of hosiery and release of the hosiery toe from the gripping fingers to propel the hosiery toe to the hosiery delivery mechanism for delivery by the latter to a discharge station.

42. Hosiery inspecting and handling apparatus according to claim 38, further including hosiery delivery mechanism including hosiery coacting clasping fingers mounted for reciprocating movement in a path between a pickup end located in proximate spaced relation to the turning means and toe end of the form and a discharge end, power means for reciprocating the hosiery clasping fingers in their path and means for automatically opening the coacting clasping fingers for receiving hosiery, causing the fingers to close and clasp hosiery during delivery movement on their path and to open again at the discharge end for the discharge of hosiery, air jet means automatically operative after turning of hosiery and release of the hosiery toe by the gripping fingers to deliver the hosiery toe to the open coacting clasp fingers of the delivery mechanism and automatic control means operative upon delivery of the toe of hosiery to the clasping fingers to cause the power-operated reciprocating means to reciprocate the clasp fingers in their path.

43. Hosiery inspecting and handling apparatus including an expansible hosiery inspecting form having laterally expansible gripping fingers adapted when collapsed to grip the toe of hosiery on the form, power-operated means for expanding and collapsing the form, power-operated hosiery stripping mechanism beside the form to strip hosiery lengthwise from the form while the gripping fingers are collapsed in gripping engagement with the hosiery toe, hosiery turning means located outwardly of the toe end of the form to turn hosiery after stripping from the form while the hosiery toe is gripped by the gripping fingers, means for delivering hosiery from the toe end of the form to the turning means, power-operated hosiery delivery mechanism adapted to deliver turned hosiery from the turning means to a discharge station, means for delivering the toe of hosiery after release by the gripping fingers to the delivery mechanism, and automatic control means operative to cause the stripping mechanism to strip hosiery from the form, to cause the stripped hosiery to be delivered to the turning mechanism by the first hosiery delivery means, to cause the turning mechanism to turn the hosiery while the hosiery toe is gripped by the gripping fingers, to cause the form actuating means to expand the form for release of the hosiery toe by the gripping fingers, to cause the released hosiery toe to be delivered to the hosiery delivery mechanism by the second delivery means and to cause the hosiery delivery mechanism to deliver the hosiery to a discharge station, all in timed relation.

44. Hosiery inspecting and handling apparatus according to claim 43, wherein the hosiery turning means comprises hosiery manipulating air jets and the first and second hosiery delivery means comprise air jets.

45. Hosiery inspecting and handling apparatus comprising an expansible hosiery form for receiving hosiery to be inspected, toe gripping fingers at the toe end of the form operated by collapse and expansion of the form to grip and release the toe of hosiery on the form, a hosiery receiving tube disposed at the toe end of said form, and means beside the form for stripping hosiery from the form and directing the hosiery into said tube while the toe of the hosiery is gripped by said fingers to turn the hosiery.

46. Hosiery inspecting and handling apparatus comprising an expansible hosiery form, toe gripping fingers at the toe end of the form operated by collapse and expansion of the form to grip and release the toe of hosiery on the form, a hosiery receiving tube disposed at the toe end of said form, stripping means beside the form movable longitudinally of the form to strip hosiery therefrom while the toe of the hosiery is gripped by said fingers, and air jet means disposed at the toe end of said form for directing the turned hosiery into said tube.

47. Hosiery inspecting and handling apparatus comprising an expansible hosiery form, toe gripping fingers at the toe end of the form operated by collapse and expansion of the form to grip and release the toe of hosiery on the form, a hosiery receiving tube disposed at the toe end of said form, means beside the form automatically operated for stripping hosiery from the form and directing the hosiery into said tube while the toe of the hosiery is gripped by said fingers to turn the hosiery, and control means operated automatically following the stripping and turning of the hosiery for expanding said form to release the toe of the hosiery gripped by said fingers.

48. Hosiery inspecting and handling apparatus comprising an expansible hosiery form, toe gripping fingers at the toe end of the form operated by collapse and expansion of the form to grip and release the toe of hosiery on the form, a hosiery receiving tube disposed at the toe end of said form, means movable longitudinally of the form for stripping hosiery therefrom while the toe of the hosiery is gripped by said fingers, air jet means at the toe end of said form for directing the stripped hosiery into said tube to turn the hosiery, and means automatically operated following the turning of the hosiery for expanding said form to release the toe end of the hosiery from said fingers.

49. Hosiery inspecting and handling apparatus comprising an expansible hosiery inspecting form, a hosiery receiving tube disposed at the toe end of said form, stripping means movable longitudinally of the form to strip hosiery therefrom, and air jets arranged to direct air streams along the toe end of said form to turn the hosiery and direct the turned hosiery into said tube.

50. Hosiery inspecting and handling apparatus comprising an expansible hosiery inspecting form, fingers at the toe end of said form for gripping the toe of hosiery on the form, a hosiery receiving tube disposed at the toe end of said form, stripping means movable longitudinally of the form to strip hosiery therefrom while the toe end thereof is gripped by said fingers, air jets arranged to direct air streams along the toe end of said form to turn the hosiery and transfer the turned hosiery into said tube, and means automatically operable to release said fingers from the toe end of the hosiery following transfer of the hosiery into said tube.

51. Hosiery handling apparatus comprising a form on which hosiery may be placed, toe gripping fingers at the end of said form to grip the toe end of hosiery on the form, a hosiery receiving tube disposed at the toe end of said form, and means beside the form for stripping hosiery from the form and directing the hosiery into said tube while the toe end thereof is gripped by said fingers.

52. Hosiery handling apparatus comprising a form for receiving hosiery, toe gripping fingers at the toe end of said form for gripping the toe of hosiery on the form, a hosiery receiving tube disposed at the toe end of said form, stripping means movable longitudinally of the form for removing hosiery therefrom while the toe end of the hosiery is gripped by said fingers, and air jet means arranged to direct air streams along the toe end of said form to transfer stripped hosiery into said tube while the toe of the hosiery is gripping by said fingers.

53. Hosiery handling apparatus comprising a form for receiving hosiery, toe gripping fingers at the toe end of said form for gripping the toe of hosiery on the form, a hosiery receiving tube disposed at the toe end of said form, stripping means movable longitudinally of the form for stripping hosiery from the form while the toe of the hosiery is gripped by said fingers, air jet means arranged to direct streams of air along the toe end of said form to transfer stripped hosiery to said tube while the toe end of said hosiery is gripped by said fingers, and means operative following transfer of the hosiery to said tube for releasing said fingers from the toe end of the hosiery.

54. Hosiery handling apparatus comprising a form for receiving hosiery, toe gripping fingers at the end of said form for gripping the toe of hosiery on the form, a hosiery receiving tube disposed at the toe end of said form, stripping means movable longitudinally of the form for stripping hosiery from the form while the toe of the hosiery is gripped by said fingers, a first air jet means arranged to direct air streams along the toe end of said form to transfer stripped hosiery to said tube, and further air jet means at the mouth of said tube for forcing the hosiery into said tube to permit the turning of the hosiery while the toe end of the hosiery is gripped by said fingers.

55. In hosiery inspecting and handling appaartus having an expansible hosiery form, a stripping mechanism beside the form for removing inspected hosiery from the form, and a tube at the toe end of the form for receiving turned hosiery stripped from the form, hosiery delivery apparatus comprising a receptacle transversely arranged relative to the form and tube, delivery fingers movably mounted at the toe end of the form for gripping the toe of hosiery extending from the tube, and means for moving said delivery fingers to draw hosiery over the receptacle and deposit the hosiery therein.

56. In hosiery inspecting and handling apparatus, the hosiery delivery apparatus defined in claim 55 wherein a tamper is supported on said receptacle and automatically moved into said receptacle following the deposit of hosiery to tamp the hosiery placed in the receptacle.

57. In hosiery inspecting and handling apparatus, the hosiery delivery apparatus defined in claim 55, wherein air jets are disposed adjacent the end of the tube to direct a stream of air across the tube and force the toe of hosiery extending from the tube into position to be gripped by said delivery fingers.

58. In a hosiery inspecting and handling apparatus, a hosiery delivery device comprising a hollow hosiery-receiving tube, and a hosiery transfer means reciprocating along a path extending from adjacent the mouth of said tube, said transfer means engaging the toe of hosiery disposed in said tube to withdraw the hosiery from said tube and deposit the hosiery along said path.

59. In a hosiery inspecting and handling apparatus, a hosiery delivery device comprising a hollow hosiery-receiving tube, and a hosiery transfer means reciprocating along a path extending from adjacent the mouth of said tube, said transfer means engaging the toe of hosiery disposed in said tube to withdraw hosiery from said tube and deposit the hosiery along said path and including pneumatic pressure differential applying means assisting said transfer means to transfer the hosiery.

60. In a hosiery inspecting and handling apparatus, a hosiery delivery device comprising an inspection form, a hollow hosiery-receiving tube axially aligned with said form, and a hosiery transfer means reciprocating along a path extending from adjacent the end of said tube, said transfer means engaging the toe of hosiery disposed in said tube to withdraw the entire length of the hosiery from said tube and deposit the hosiery along said path.

61. In a hosiery inspecting and handling apparatus, a hosiery delivery device comprising an inspection form, a hollow hosiery-receiving tube axially aligned with said form, pneumatic pressure differential applying means for withdrawing hosiery from said form and positioning the hosiery in said receiving tube, a hosiery transfer means reciprocating along a path extending from adjacent the end of said tube, said transfer means engaging the toe of hosiery disposed in said tube to withdraw the entire length of the hosiery from said tube and deposit the hosiery along said path and including pneumatic pressure differential applying means assisting said transfer means to transfer the hosiery.

62. A hosiery inspecting and handling apparatus comprising a hosiery inspecting form, gripping means forming a part of said apparatus arranged to engage and grip the toe of the hosiery, and means forming a part of said apparatus for directing an air stream away from said gripping means while the toe of the hosiery is gripped by said gripping means to extend the hosiery away from said gripping means.

References Cited in the file of this patent

UNITED STATES PATENTS

| | | |
|---|---|---|
| 964,959 | Ermentrout | Dec. 17, 1931 |
| 2,404,346 | Bartimore | July 23, 1946 |

FOREIGN PATENTS

| | | |
|---|---|---|
| 363,034 | Great Britain | Dec. 17, 1931 |